(12) United States Patent
Okada et al.

(10) Patent No.: US 7,084,885 B2
(45) Date of Patent: Aug. 1, 2006

(54) IMAGE PROCESSING APPARATUS AND DISPLAY CONTROL METHOD

(75) Inventors: Satoru Okada, Kyoto (JP); Masahiro Ishizuka, Kyoto (JP); Takuma Matsunada, Kyoto (JP); Tsuyoshi Kiyuna, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 644 days.

(21) Appl. No.: 09/994,943

(22) Filed: Nov. 28, 2001

(65) Prior Publication Data

US 2003/0098821 A1  May 29, 2003

(51) Int. Cl.
*G09G 5/00* (2006.01)
*H04M 3/42* (2006.01)
*H04B 1/38* (2006.01)

(52) U.S. Cl. ............... 345/619; 345/635; 455/415; 455/566

(58) Field of Classification Search ............ 345/636, 345/629, 634, 530–39; 455/73, 566, 415
See application file for complete search history.

(56) References Cited

U.S. PATENT DOCUMENTS

| | | | | |
|---|---|---|---|---|
| 5,029,019 A | * | 7/1991 | Yoshihara et al. | 358/447 |
| 5,945,972 A | * | 8/1999 | Okumura et al. | 345/98 |
| 6,351,291 B1 | * | 2/2002 | Asano | 348/564 |
| 6,553,223 B1 | * | 4/2003 | Bayley et al. | 455/419 |
| 6,657,621 B1 | * | 12/2003 | Staudacher | 345/204 |
| 6,704,027 B1 | * | 3/2004 | Nakano | 345/636 |
| 6,865,386 B1 | * | 3/2005 | Aoyama et al. | 455/415 |
| 2001/0055983 A1 | * | 12/2001 | Ohmura et al. | 455/566 |
| 2002/0063716 A1 | * | 5/2002 | Osborn et al. | 345/533 |

OTHER PUBLICATIONS

Okada et al., U.S. Appl. No. 09/994,914, filed Nov. 2001.

* cited by examiner

*Primary Examiner*—Kee M. Tung
*Assistant Examiner*—Chante Harrison
(74) *Attorney, Agent, or Firm*—Nixon & Vanderhye, P.C.

(57) ABSTRACT

An example image display apparatus includes processing circuitry such as a communication processor and a game processor. The processing circuitry continuously processes a communication-related function and selectively processes a game-related function. When the game function is in an off-state, binary image data and color image data for the communication-related function are written to a first memory and to a second memory, respectively. When the game function is set to an on-state, color image data for the game-related function is written to the second frame memory instead of the color image data for the communication-related function. A display includes a composite image based on the binary image data stored in the first memory and the color image data stored in the second memory.

31 Claims, 39 Drawing Sheets

FIG.6
(A)
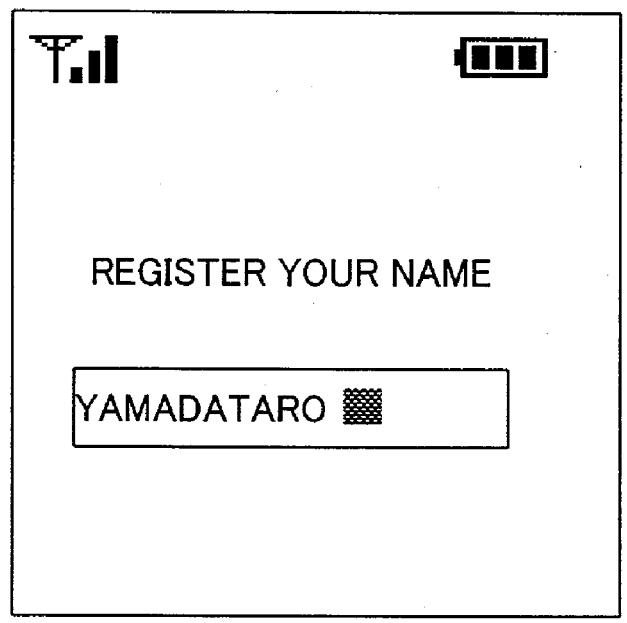
(B)
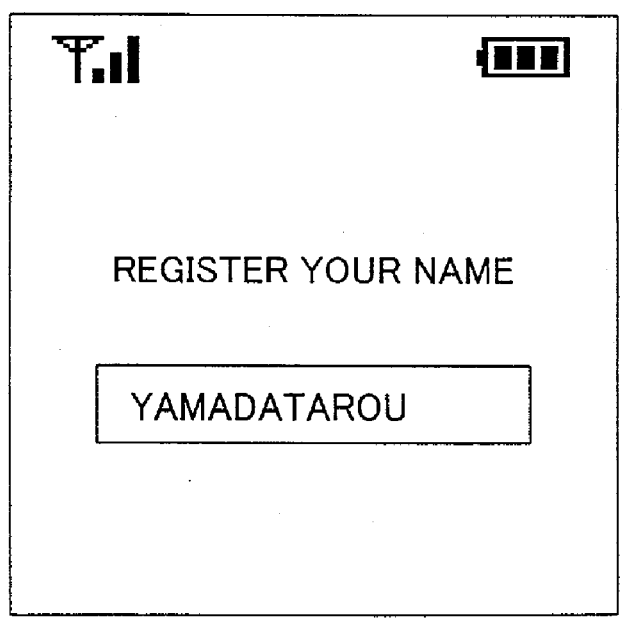

FIG.14

| d07 | d06 | d05 | d04 | d03 | d02 | d01 | d00 |
|-----|-----|-----|-----|-----|-----|-----|-----|
| –   | –   | LCNT5 | LCNT4 | LCNT3 | LCNT2 | LCNT1 | LCNT0 |

LCNT0: MODE SELECTION FLAG
  0: PHONE
  1: GAME
LCNT1: BINARY IMAGE OUTPUT CONTROL FLAG
  0: INTERRUPTION
  1: OUTPUT
LCNT2: COLOR IMAGE BLENDING CONTROL FLAG
  0: NORMAL
  1: BLENDING
LCNT4,3: COLOR IMAGE TONE CONTROL FLAG
  00: INTERRUPTION
  01: TONE DOWN
  10: EQUALIZED TONE
  11: TONE UP
LCNT5: LCD DISPLAY ON /OFF FLAG
  0: DISPLAY ON
  1: DISPLAY OFF

FIG.15

GAME KEY REGISTER 1

| d7 | d6 | d5 | d4 | d3 | d2 | d1 | d0 |
|---|---|---|---|---|---|---|---|
| K7 | K6 | K5 | K4 | K3 | K2 | K1 | K0 |

K7: SELECT KEY
K6: START KEY
K5: CROSS KEY (RIGHT)
K4: CROSS KEY (LEFT)
K3: CROSS KEY (DOWN)
K2: CROSS KEY (UP)
K1: B BUTTON
K0: A BUTTON

GAME KEY REGISTER 2

| d7 | d6 | d5 | d4 | d3 | d2 | d1 | d0 |
|---|---|---|---|---|---|---|---|
| KI7 | KI6 | KI5 | KI4 | KI3 | KI2 | KI1 | KI0 |

KI7: SELECT KEY
KI6: START KEY
KI5: CROSS KEY ( RIGHT )
KI4: CROSS KEY ( LEFT )
KI3: CROSS KEY ( DOWN )
KI2: CROSS KEY ( UP )
KI1: B BUTTON
KI0: A BUTTON

GAME KEY REGISTER 3

| d7 | d6 | d5 | d4 | d3 | d2 | d1 | d0 |
|---|---|---|---|---|---|---|---|
| KO7 | KO6 | KO5 | KO4 | KO3 | KO2 | KO1 | KO0 |

KO7: SELECT KEY
KO6: START KEY
KO5: CROSS KEY ( RIGHT )
KO4: CROSS KEY ( LEFT )
KO3: CROSS KEY ( DOWN )
KO2: CROSS KEY ( UP )
KO1: B BUTTON
KO0: A BUTTON

FIG.32

0000000000101001: KEY ASSIGNMENT REQUEST
0000000000001010: KEY CODE INDICATIVE OF 「#」
0000000010000000: FUNCTION INFORMATION INDICATIVE OF SELECT
0000000000001011: KEY CODE INDICATIVE OF 「*」
0000000001000000: FUNCTION INFORMATION INDICATIVE OF START
0000000000000000: END CODE

| KEY | KEY CODE | FUNCTION INFORMATION |
|---|---|---|
| # | 1010 | SELECT |
| * | 1011 | START |
| 0 | | |
| 1 | | |
| 2 | | |
| ⋮ | ⋮ | ⋮ |
| 9 | | |

FIG.36
(A)
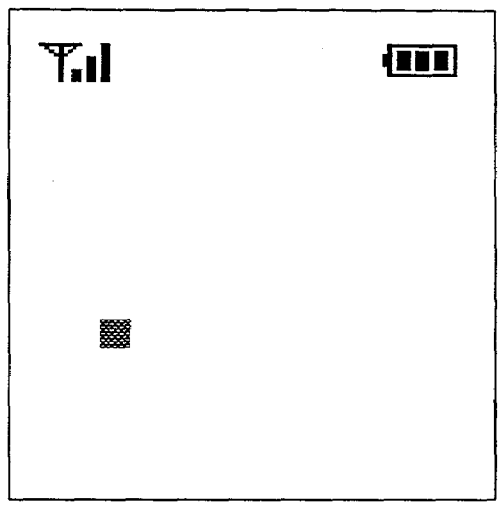
(B)
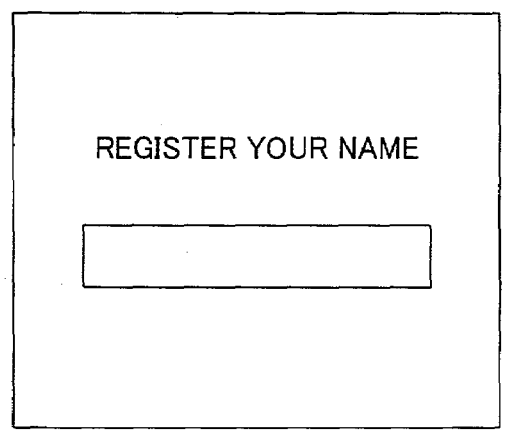
(C)
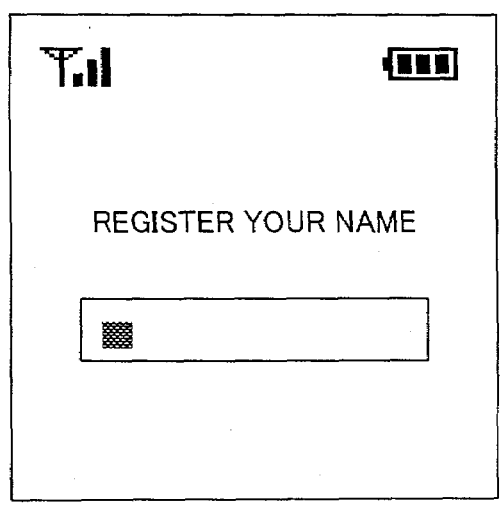

FIG.37
(A)
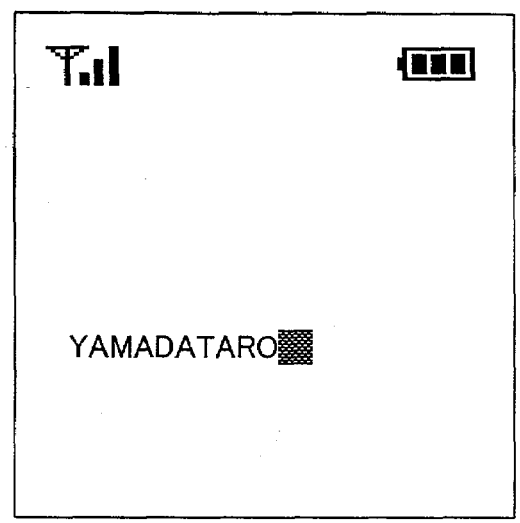
(B)
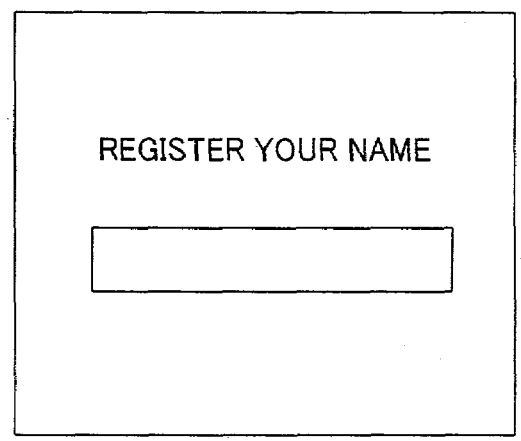
(C)
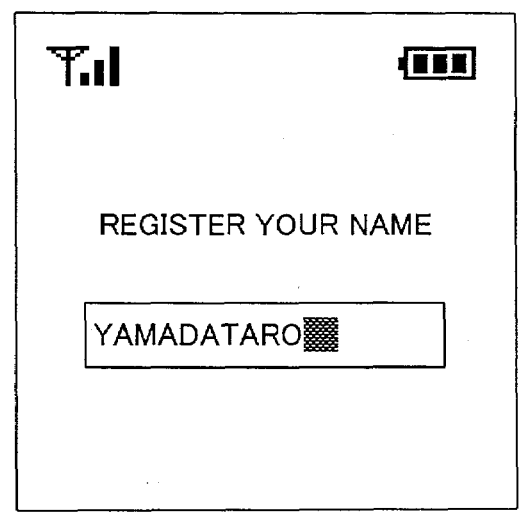

FIG.38
(A)
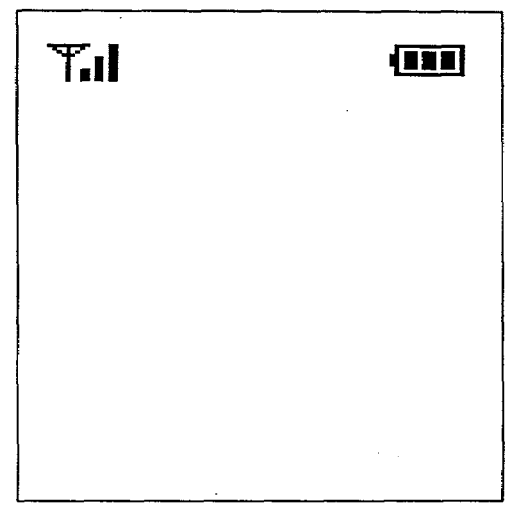
(B)
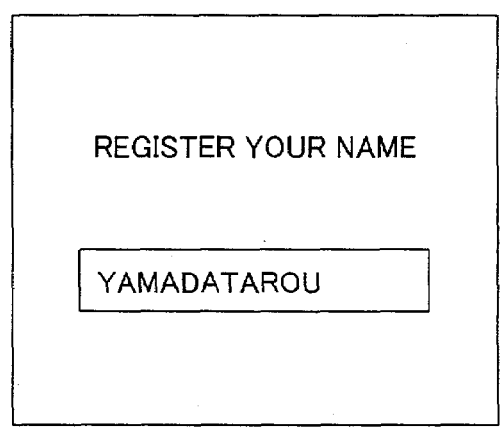
(C)
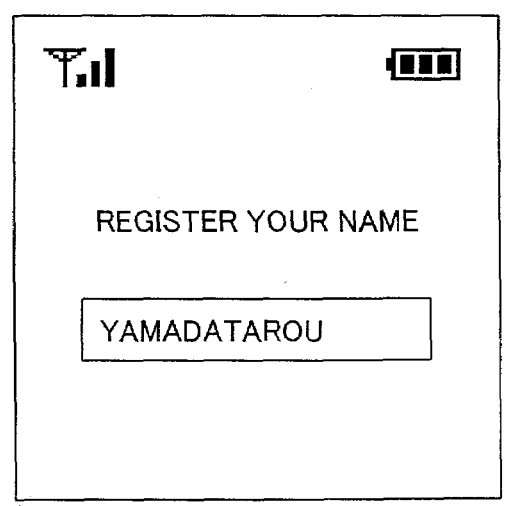

IMAGE PROCESSING APPARATUS AND DISPLAY CONTROL METHOD

BACKGROUND OF THE INVENTION

1. Field of the Invention

The present invention relates to an image display apparatus. More specifically, the present invention relates to an image display apparatus for displaying on a display an image based on binary image data and color image data.

2. Description of the Prior Art

As conventional such a kind of image display apparatus, some have a plurality of processors and a plurality of memories being assigned to respective processors, and displays on a display a composite image based on image data read out of the memories by the processors.

However, in the prior art, it is impossible to arbitrarily change a parallelism between the processors and the memories, and therefore, it is impossible to efficiently use the memories.

SUMMARY OF THE INVENTION

Therefore, it is a primary object of the present invention to provide a novel image display apparatus.

It is another object of the present invention to provide an image display apparatus capable of utilizing memories with efficiency.

It is the other object of the present invention to provide a display control method capable of utilizing memories with efficiency.

It is further object of the present invention to provide a display control program capable of utilizing memories with efficiency.

It is another object of the present invention to provide a storage medium stored with a display control program capable of utilizing memories with efficiency.

According to the present invention, an image display apparatus, comprises: first function processing means for processing a first function being continuously set into an on state; second function processing means for processing a second function being set into an on state in case of necessity; first writing means for writing first image data relating to the first function to a first memory; second writing means for writing second image data relating to the first function into a second memory; third writing means for writing second image data relating to the second function to the second memory; display means for displaying a composite image on a display on the basis of the first image data stored in the first memory and the second image data stored in the second memory; and validating means for selectively validating the second writing means or the third writing means in response to turning on/off the second function.

The first function processing means processes the first function being continuously set into an on state, and the second function processing means processes the second function being set into an on state in case of necessity. The first image data and the second image data relating to the first function are written to the first memory and the second memory by the first writing means and second writing means, respectively. Furthermore, the second image data relating to the second function is written to the second memory by the third writing means.

Herein, the validating means selectively validates the second writing means or the third writing means in response to the instruction of turning on/off the second function by the instruction means. When the first image data is written to the first memory by the first writing means, and the second image data is stored in the second memory by the second writing means or the third writing means, the composite image based on such the first image data and the second image data is displayed on the display by the displaying means.

In one aspect of the present invention, the first image data is image data in which each dot has a first number of bits, and the second image data is image data in which each dot has a second number of bits more than the first number of bits.

In another aspect of the present invention, the first function is a phone function, and the second function is a game function. At this time, the first image data includes at least character data indicative of a receiving state. Furthermore, the second image data written by the second writing means includes predetermined image data, and the second image data written by the third writing means includes game image data.

Preferably, the first function processing means includes detecting means for detecting an incoming call. When the incoming call is detected by the this detecting means, incoming call message writing means included in the first writing means writes the firs image data indicative of the incoming call to the first memory. In addition, tone modifying means included in the display means modifies the tone of the color image data.

In another aspect of the present invention, fetching means included in the display means fetches compositing position information indicative of a compositing position of the second image data. Compositing means generates composite image data on the basis of the compositing position information, the first image data, and the second image data.

Preferably, the first image data is binary image data in which each dot is formed by one bit, and the second image data is color image data in which each dot is formed by a plurality of number of bits. At this time, in the compositing means, first single color data in correspondence to a first predetermined bit value of the binary image data is fetched by first single color data fetching means, and second single color data in correspondence to a second predetermined bit value of the binary image data is fetched by second single color data fetching means.

First selecting means selects any one of the first single color data and the color image data according to the compositing position information. On the other hand, identifying means identifies a bit value of the binary image data every one dot, and second selecting means selects any one of an output of the first selecting means and the second single color data in accordance with an identification result of the identifying means. Therefore, the composite image data is generated.

In further aspect of the present invention, readout start position information of the second image is fetched by readout start position information fetching means in the displaying means. Readout means reads the second image data from the second memory according to the fetched readout start position information. Therefore, a display image based on the second image data is scrolled by updating the readout start position information per a predetermined amount.

In another aspect of the present invention, the display means displays the image based on the first image data by priority.

According to the present invention, because the second writing means for writing the binary image data relating to the first function to the second memory or the third writing means for writing the second image data relating to the second function to the second memory is selectively validated in response to turning on/off the second function, it is possible to utilize the second memory with efficiency.

Furthermore, because the composite image based on the first image data stored in the first memory and the second image data stored in the second memory is displayed on the display, it is possible to display the composite image irrespective of turning on/off the second function.

It is noted, if the first image data is important image data of an icon, an incoming call message, and etc., the information can be transmitted to the operator in both the phone mode and the game mode by displaying the image based on this first image data by priority.

According to the present invention, a display control method executed by an image display apparatus provided with a first function being continuously set into an on state and a second function being set into an off state in case of necessity, comprises steps of: (a) writing first image data relating to the first function to a first memory; (b) writing second image data relating to the first function to a second memory when the second function is in an off state; (c) writing second image data relating to the second function to the second memory when the second function is in an on state; and (d) displaying a composite image on a display on the basis of the first image data stored in the first memory and the second image data stored in the second memory.

According to the present invention, a display control program executed by an image display apparatus provided with a first function being continuously set into an on state and a second function being set into an off state in case of necessity, comprises steps of: (a) writing first image data relating to the first function to a first memory; (b) writing second image data relating to the first function to a second memory when the second function is in an off state; (c) writing second image data relating to the second function to the second memory when the second function is in an on state; and (d) displaying a composite image on a display on the basis of the first image data stored in the first memory and the second image data stored in the second memory.

According to the present invention, a storage medium storing a display control program executed by an image display apparatus provided with a first function being continuously set into an on state and a second function being set into an off state in case of necessity, the display control program, comprises steps of: (a) writing first image data relating to the first function to a first memory; (b) writing second image data relating to the first function to a second memory when the second function is in an off state; (c) writing second image data relating to the second function to the second memory when the second function is in an on state; and (d) displaying a composite image on a display on the basis of the first image data stored in the first memory and the second image data stored in the second memory.

Because the second image data relating to the first function is written to the second memory when the second function is in an off state, and the binary image data relating to the second function is written to the second memory when the second function is in an on state, it is possible to utilize the second memory with efficiency.

In addition, because the composite image based on the first image data stored in the first memory and the second image data stored in the second memory is displayed on the display, it is possible to display the composite image irrespective of the on/off state of the second function.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6(A) is an illustrative view showing one example of a player name input screen when inputting a player's name;

FIG. 6(B) is an illustrative view showing one example of the player name input screen after having finished inputting the player's name;

FIG. 14 is an illustrative view showing a configuration of LCD control data;

FIG. 15 is an illustrative view showing a configuration of game key registers 1 to 3;

FIG. 32 is an illustrative view showing data set in a FIFO register 1 during key assignment processing;

FIG. 33 is an illustrative view showing one example of a function assignment table;

FIG. 36(A) is an illustrative view showing binary image data drawn in the frame memory 86 during player's name input processing;

FIG. 36(B) is an illustrative view showing color image data drawn in the frame memory 88 during the player's name input processing;

FIG. 36(C) is an illustrative view showing a player's name input screen displayed on the LCD;

FIG. 37(A) is an illustrative view showing binary image data drawn in the frame memory 86 during the player's name input processing;

FIG. 37(B) is an illustrative view showing color image data drawn in the frame memory 88 during the player's name input processing;

FIG. 37(C) is an illustrative view showing a player's name input screen displayed on the LCD;

FIG. 38(A) is an illustrative view showing binary image data drawn in the frame memory 86 during the player's name input processing;

FIG. 38(B) is an illustrative view showing color image data drawn in the frame memory 88 during the player's name input processing;

FIG. 38(C) is an illustrative view showing a player's name input screen displayed on the LCD;

DETAILED DESCRIPTION OF THE PREFERRED EMBODIMENTS

Figure 1:
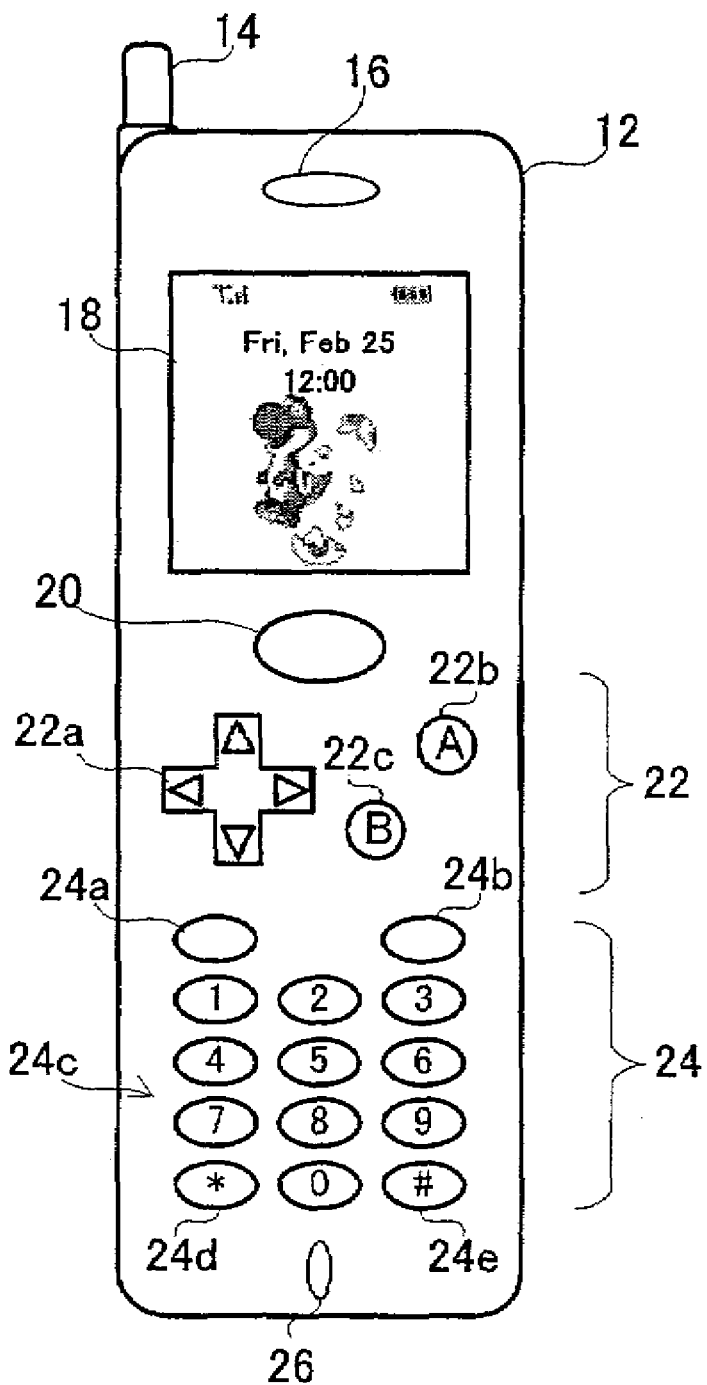
FIG. 1 is an appearance view showing one embodiment of the present invention.

Referring to FIG. 1, a portable communication terminal with game function 10 of this embodiment includes a long thin rectangular formed main body 12. The main body 12 has an antenna 14 protruded from the upper surface thereof, and is provided with a speaker 16, a color LCD 18, a game start key 20, a game key 22, a phone key 24, and a microphone 26 on its front surface.

As the game key 22, there exists a cross key 22a which instructs a hero developing a game to move in a predetermined direction (e.g. go ahead, go back, turnaround, jump and etc.) and an A button 22b and B button 22c which instruct the hero to act in a predetermined manner (e.g. obtention of an item and attack on a target). Furthermore, as the phone key 24, there exists a hook key 24a, a hold key 24b, number-keys 24c indicative of "0" to "9", a * key 24d, and a # key 24e.

Figure 2:
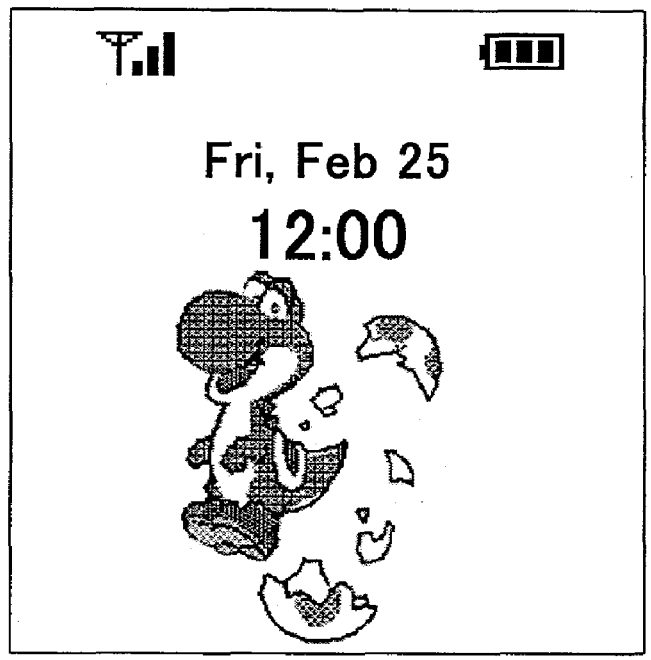
FIG. 2 is an illustrative view showing one example of an incoming call standby screen.

An incoming call stand-by screen as shown in FIG. 2 is displayed on the LCD 18 in an incoming call stand-by state. According to FIG. 2, a today's date, a current time, and a game character created by the applicant are displayed on the center of the screen, and characters indicative of a receiving state and a remaining amount of a battery are displayed on the upper portion of the screen. If an operator performs a dialing operation utilizing the hook key 24a and the number keys 24c in the incoming call stand-by state, the dialed telephone number is displayed on the LCD 18, and calling processing for an opponent is executed. If the opponent operates to receive the incoming call in response to the calling, a protocol is established, thus, capable of talking. On the other hand, if there is an incoming call from the opponent, an incoming call message and a telephone number of the transmission source are displayed on the LCD 18, and a ring tone is outputted from a speaker 48 (referring to FIG. 7) provided on the back surface of the main body 12. If the operator herein operates the hook key 24a, the output of the ring tone is stopped, and the protocol is established between the transmission source, thus, leading to a communication enable state.

Figure 3:
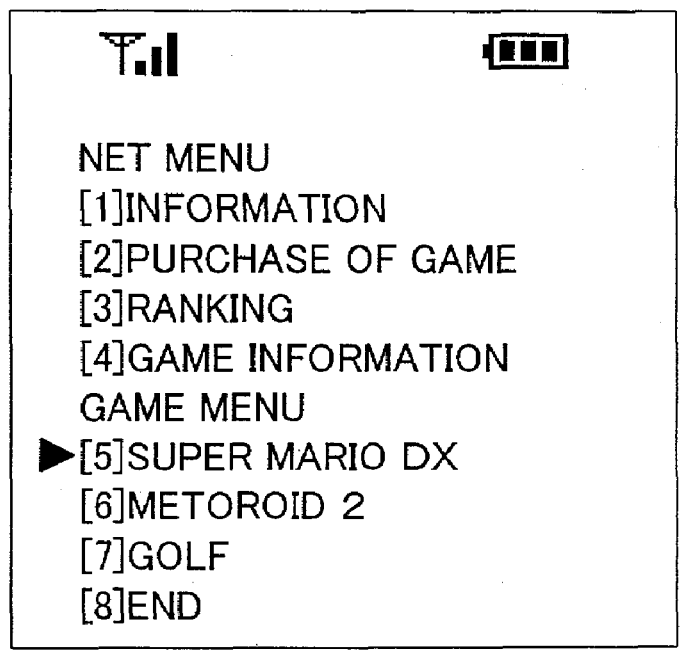
FIG. 3 is an illustrative view showing one example of a menu screen.

If the operator operates the game start key 20 in the incoming call stand-by state, an operation mode is shifted from a phone mode to a game mode. First, a menu screen shown in FIG. 3 is displayed. When the operator selects a desired game (e.g. Super Mario DX) from the menu screen, the selected game is started. The display on the LCD 18 is renewed to a game screen shown in FIG. 4, and a BGM is outputted from the speaker 48 on the back surface. The game proceeds in response to an operation of the game key 22 described above, and effect sound is outputted from the speaker 48 as necessary.

In this embodiment, in the game mode, the * key 24d functions as a start key, and the # key 24e functions as a select key (another phone keys may function as a start key and a select key). Accordingly, the game in progress is interrupted/resumed in response to an operation of the * key 24d. Specifically, when the * key 24d is pressed during a progress of the game, a pause state is set, whereby, a motion of the game screen is stopped, and the output of the BGM is interrupted. If the * key 24d is pressed again, the pause state is canceled, whereby the game screen starts to move, and an output of the BGM is resumed. In addition, for example, a cursor on the screen is moved by operating the # key 24e on a player selection screen.

Figure 4:
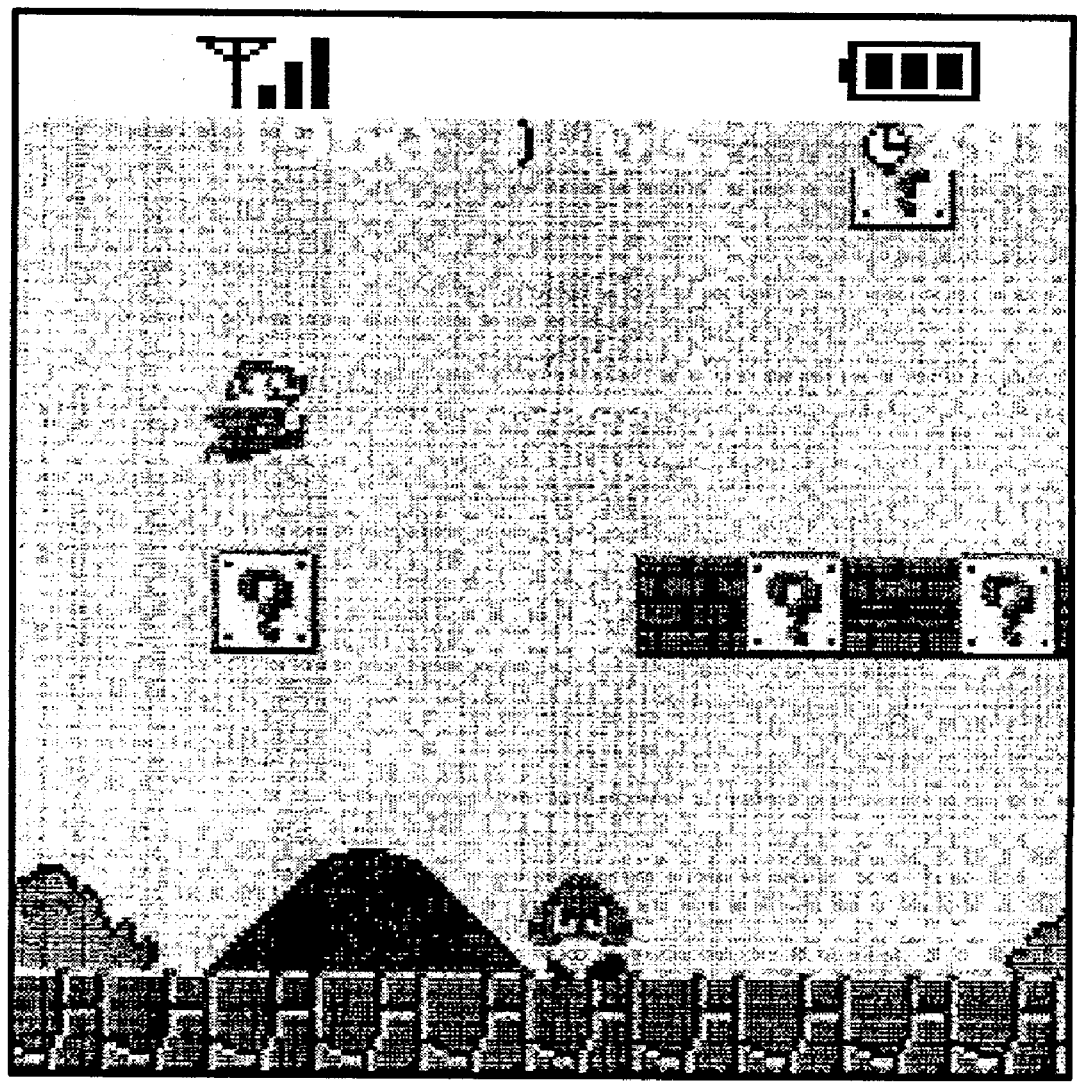
FIG. 4 is an illustrative view showing one example of a game screen.
Figure 5:
FIG. 5 is an illustrative view showing one example of an incoming call guide screen.

Even if the game is in progress, detection of the incoming call is executed, and when there is the incoming call, the motion of the game screen is stopped and the output of the BGM is interrupted. That is, the game is paused in response to the incoming call. Furthermore, the ring tone is outputted from the speaker 48 in place of the BGM, and the display of the LCD 18 is renewed to an incoming call screen as shown in FIG. 5. According to FIG. 5, a tone of the game screen is changed, and an incoming call message of "IN INCOMING CALL" and the telephone number of the transmission source are displayed on the game screen. Also, at this time, the output of the ring tone is interrupted by an operation of the hook key 24a, and the protocol is established, leading to a communication enable state. After the communication is completed, the tone of the game screen is restored, and the game screen shown in FIG. 4 is displayed again.

It is noted a pause state is continued after the communication and the pause state is canceled in response to an operation of the * key 24d. More specifically, although the game is paused at the incoming call without operating the *key 24d, the pause state is canceled by operating the * key 24d. The game screen is moved and an output of the BGM is restarted as described above by canceling the pause state with the operation of the * key 24d.

If there is a need to register a player's name in the middle or at the start of the game, a player name input screen as shown in FIGS. 6(A) or 6(B) is displayed on the LCD 18. At this time, the player's name is displayed within a player's name input frame on the screen by operating the number keys 24c. Specifically, an alphabet and etc. is assigned to each number key 24c, and input processing of a desired name is executed by an operation of the number keys 24c.

Figure 7:
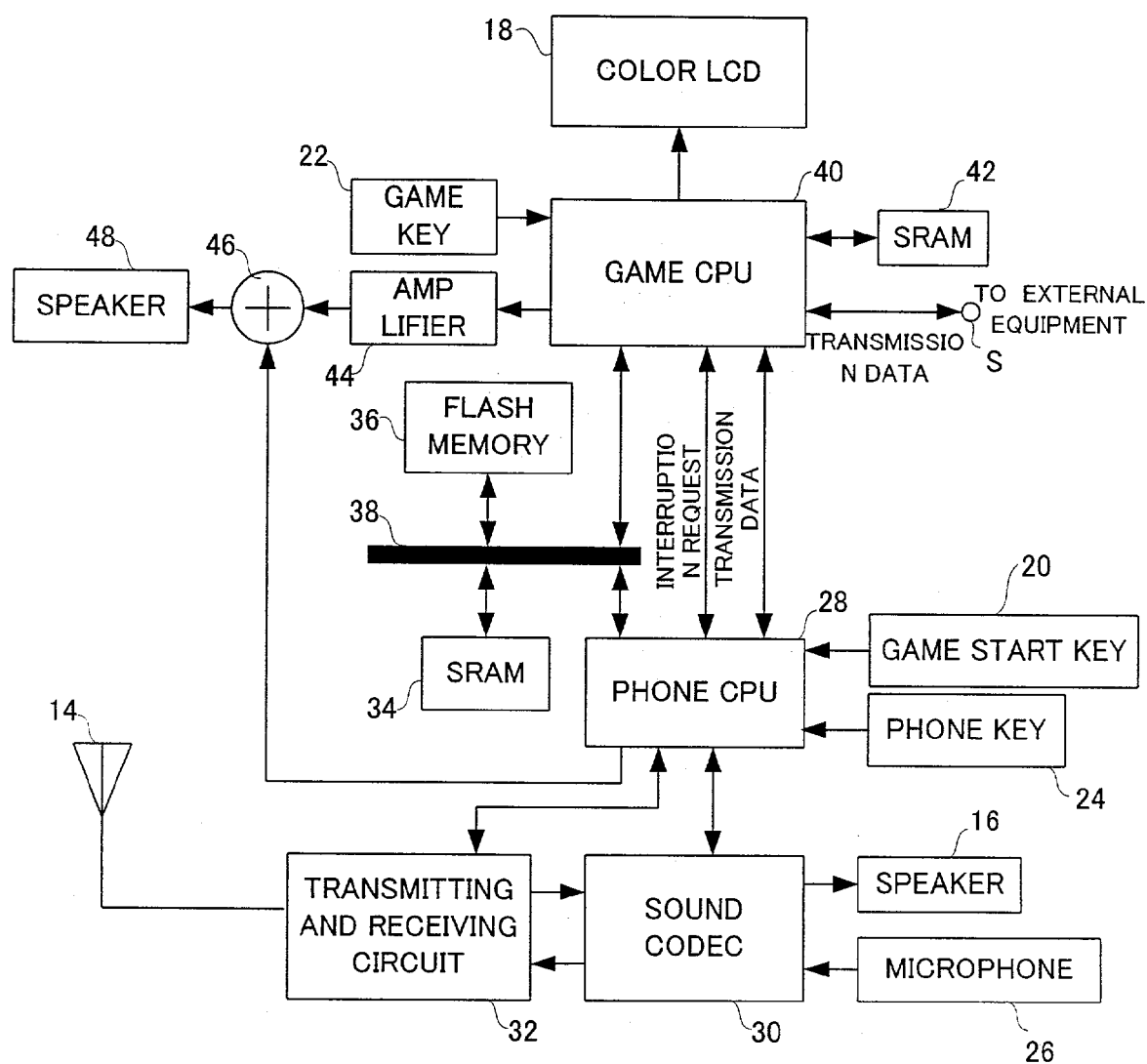
FIG. 7 is a block diagram showing a configuration of FIG. 1 embodiment.

An inside of the main body 12 is specifically constituted as shown in FIG. 7. The game start key 20 and the phone key 24 are directly connected to a CPU 28 for phone processing (phone CPU). Furthermore, the antenna 14 is connected to the phone CPU 28 via a transmitting/receiving circuit 32, and the speaker 16 and the microphone 26 are connected to the phone CPU 28 via a sound codec 30. The speaker 48 is connected to the phone CPU 28 via an accumulator 46. An SRAM 34 and a flash memory 36 are connected to the phone CPU 28 via an 8-bit bus 38. The flash memory 36 is stored with a program for phone processing (phone program) and telephone directory data, and the SRAM 34 is utilized as a work RAM during processing the phone program.

On the other hand, a CPU 40 for game processing (game CPU) is directly connected with the game key 22, the LCD 18, an SRAM 42 and an external terminal S and is connected with the speaker 48 via the accumulator 46 and an amplifier 44. The SRAM 42 is utilized as an external work RAM when processing a program for game processing (game program).

Between the phone CPU 28 and the game CPU 40, a direct correspondence of an interruption request and transmission data are performed in addition to the correspondence of data via the 8 bit-bus 38. The transmission data is also corresponded with an external apparatus (not shown) connected through the external connection-use terminal S.

Figure 8:
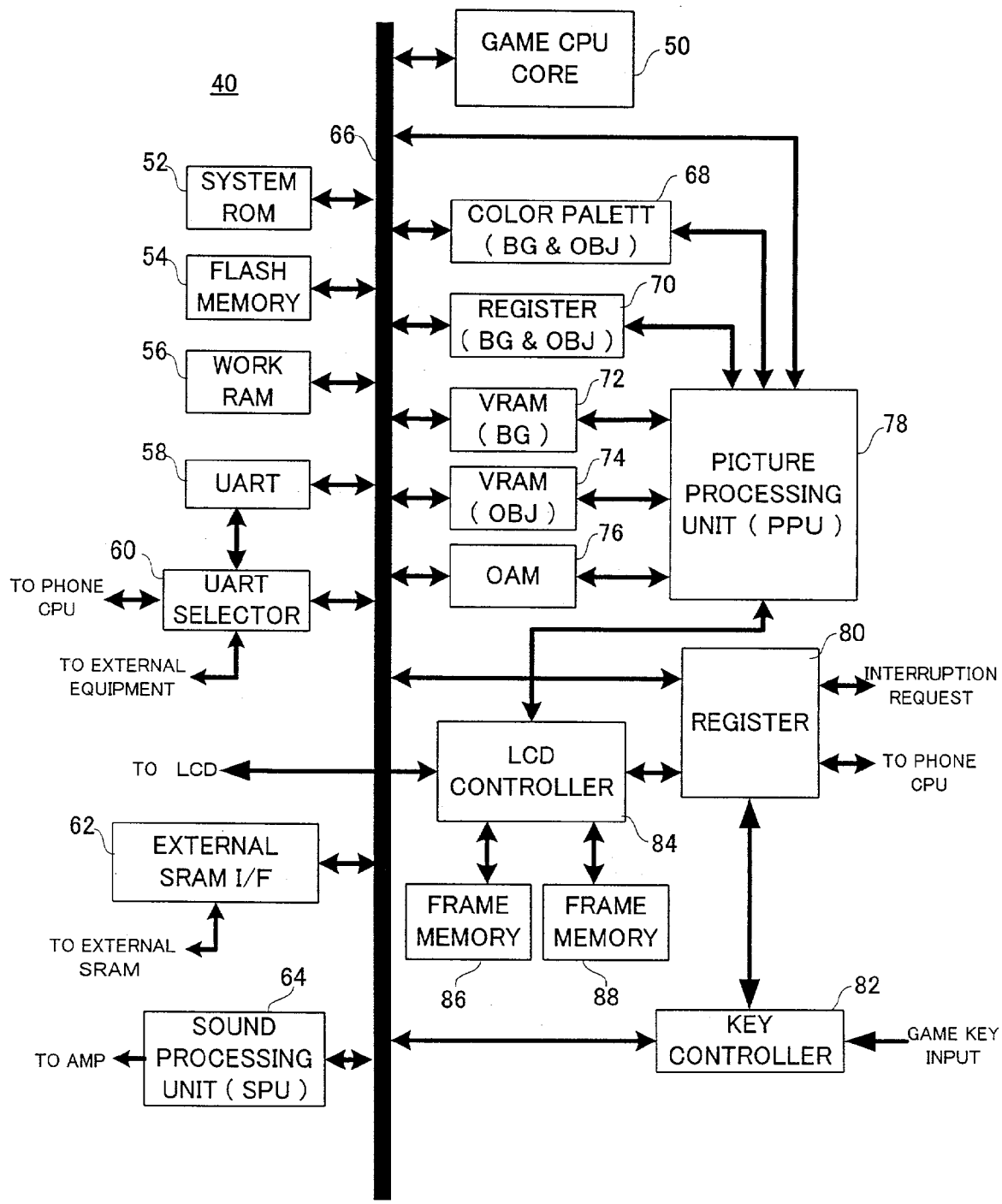
FIG. 8 is a block diagram showing a configuration of a game CPU.

The game CPU 40 is constituted as shown in FIG. 8. A game CPU core 50, a sound processing unit (SPU) 64, a picture processing unit (PPU) 78, and an LCD controller 84 are existed as processors. In addition, a system ROM 52, a flash memory 54, a work RAM 56, a color palette RAM 68, registers 70 and 80, VRAMs 72 and 74, an OAM (Object Attribute Memory) 76, frame memories 86 and 88, and a game key register 1 (referring to FIG. 9) provided on a key controller 82 are existed as external memories. Besides such the processors and the internal memories, a UART 58 and a UART selector 60 are provided for corresponding the above-described transmission data with the phone CPU 28 or the external apparatus, and an external SRAM I/F 62 for accessing the SRAM 42 shown in FIG. 7 is also provided.

Figure 9:
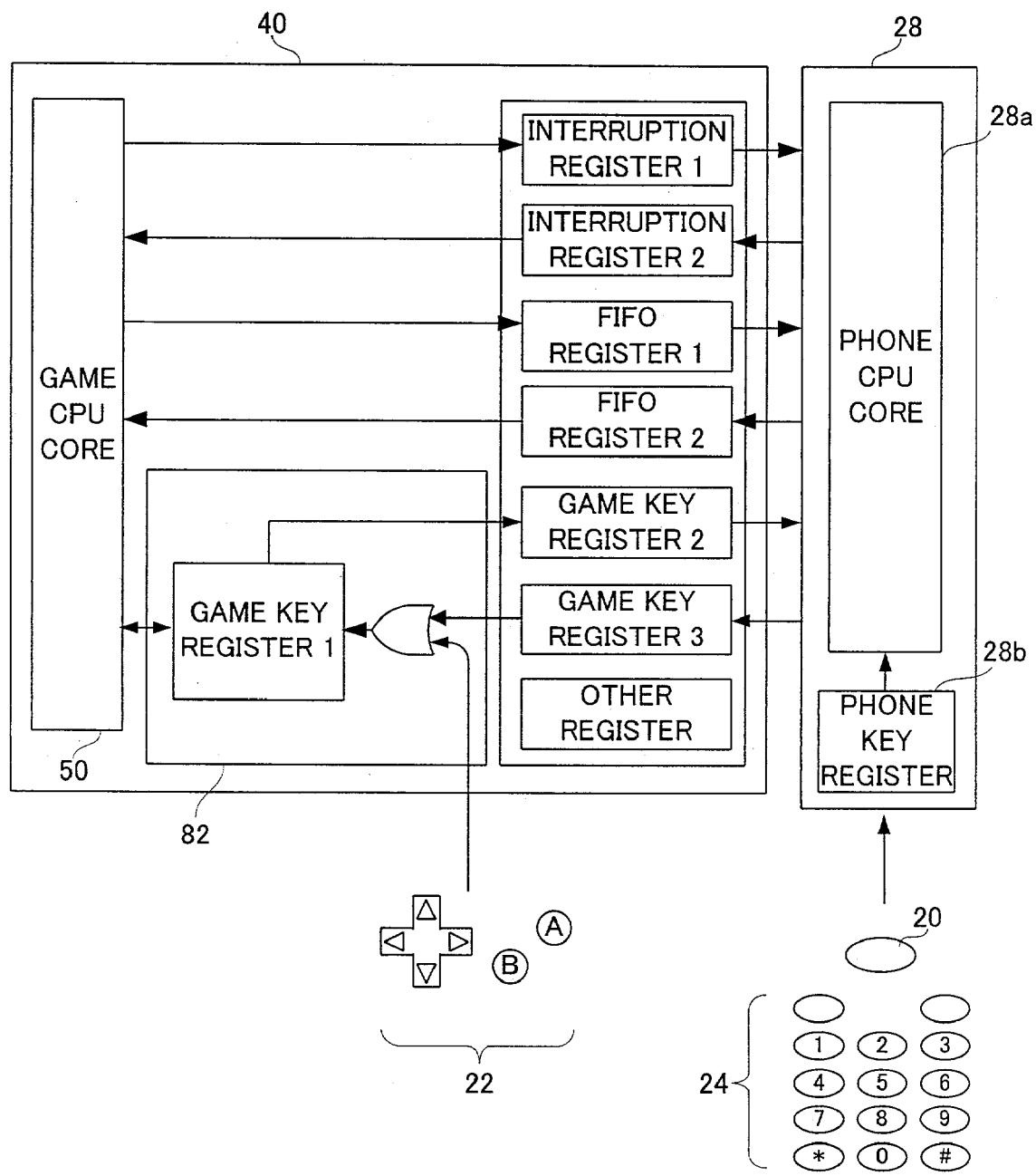
FIG. 9 is a block diagram showing a configuration of a key controller and its periphery.

Memories to which the game CPU core 50 can access are the system ROM 52, the flash memory 54, the work RAM 56, the SRAM 42, the color palette RAM 68, the register 70, the VRAMs 72 and 74, the OAM 76, a game CPU control register 80d, a FIFO register 80e, and an interruption register 80g provided in the register 80 (referring to FIG. 13), and the game key register 1 provided in the key controller 82 (referring to FIG. 9).

Memories to which the PPU 78 can gain access are the color palette RAM 68, the register 70, the VRAMs 72 and 74, and the OAM 76.

Figure 13:
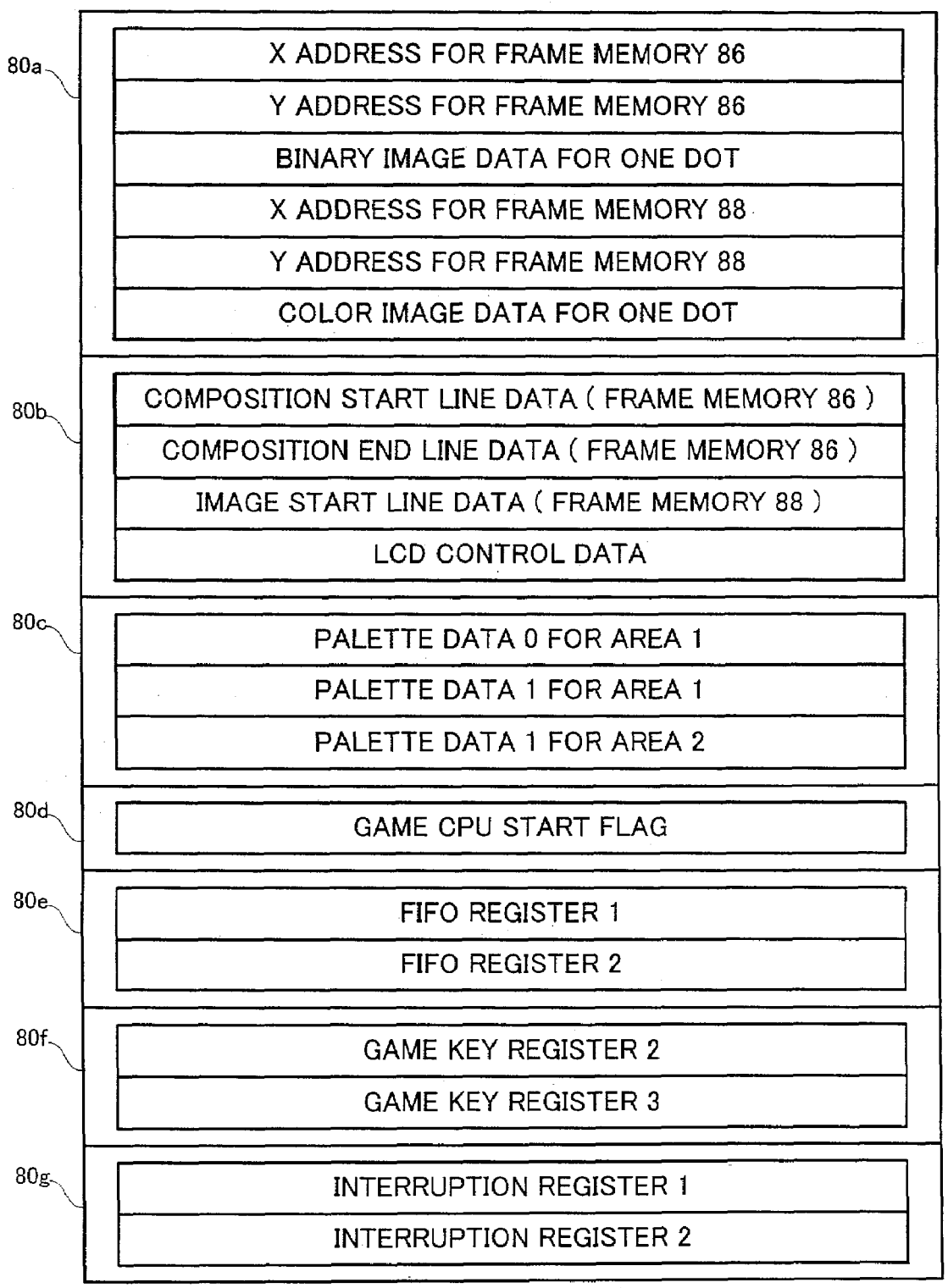
FIG. 13 is an illustrative view showing a configuration of a register 80.

Memories to which the LCD controller 84 can gain access are the frame memories 86 and 88 and a frame memory register 80a, an output control register 80b, and a palette control register 80c provided in the register 80 (referring to FIG. 13).

It is noted that although the SPU 64 can gain access to a sound ROM not shown, detailed description about sound processing will be omitted.

Figure 12:
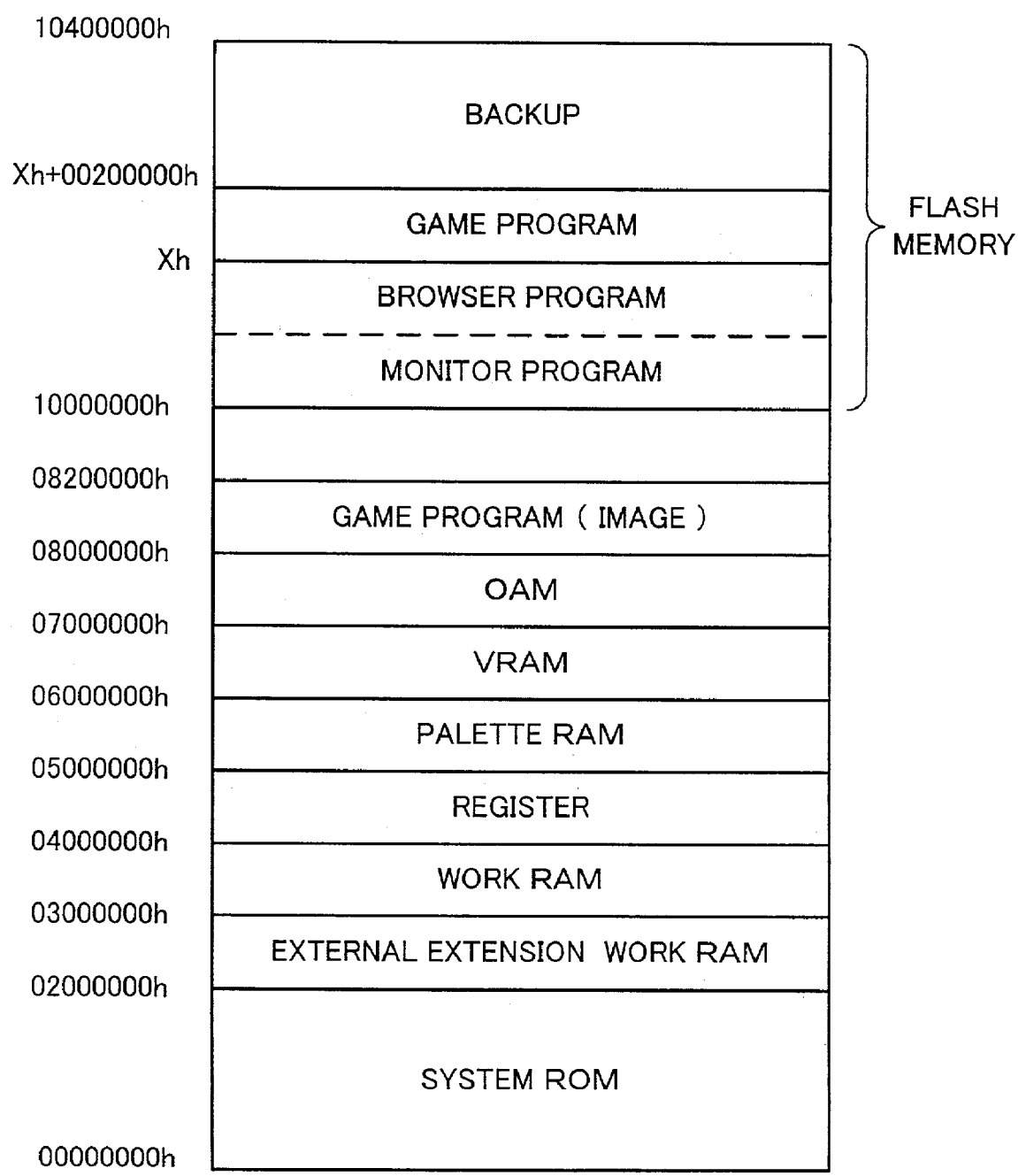
FIG. 12 is a mapping state of a memory to which a game CPU core can make an access.

A memory mapping viewed from the game CPU core 50 is shown in FIG. 12. According to FIG. 12, the system ROM 52 is assigned to "00000000h"~"01999999h", the SRAM 42 is assigned to "02000000h"~"02999999h", and the work RAM 56 is assigned to "03000000h"~"03999999h". Various kinds of the registers (70, 80d, 80e, 80g, and the game key register 1) are assigned to "04000000h"~"04999999h", and the color palette RAM 68 is assigned to "05000000h"~"05999999h". Furthermore, the VRAMs 72 and 74 are assigned to "06000000h"~"06999999h", the OAM 76 is assigned to "07000000h"~"07999999h", and the game program (image) is assigned to "08000000h"~"08199999h".

In addition, a browser program and a monitor program stored in the flash memory 54 are assigned to "10000000h"~"Xh-1", the game program stored in the flash memory 54 is assigned to "Xh"~"Xh+00199999h", and a backup stored in the flash memory 54 is assigned to "Xh+00200000h"~"10400000h". The game CPU core 50 gains access to respective memories utilizing such the addresses.

In describing each memory in detail, the system ROM 52 stores a boot program of the game CPU core 50, a recovery program in the case of a damage of the flash memory 54, and etc. Meanwhile, the flash memory 54 is, as described above, stored with the backup, the game program, the browser program, and the monitor program. The game program is downloaded from a server which is provided on the Internet and stored with a plurality of game programs. More specifically, if connecting to the server utilizing the phone function so as to select a desired game program, the selected game program is downloaded to the flash memory 54 via the phone CPU 28. The work RAM 56 and the SRAM 42 are temporarily stored with data obtained during the processing of the above-described programs.

The VRAM 72 is stored with background image data indicative of characters in a static state (static characters), the VRAM 74 is stored with object image data indicative of characters with movements (dynamic characters), and the OAM (Object Attribute Memory) 76 is stored with an attribute of each dynamic character. For example, when the game screen shown in FIG. 4 is displayed, the background image data stored in the VRAM 72 includes static character data such as a tree, a mountain, and earth. Meanwhile, the object image data stored in the VRAM 74 includes dynamic character data such as a hero jumping up in the air, a mushroom moving on the earth, and blocks floating in the air and moving slightly when pushed from underneath.

The color palette RAM 68 is stored with palette data for coloring the static character and the dynamic character, and the register 70 has a setting for designating an image mode and subjecting the screen to special effects.

Referring to FIG. 13, the frame memory register 80a has address data of the frame memories 86 and 88 and image data. More specifically, an X address and a Y address of the frame memory 86 and one dot (=8 bit) of binary image data written into the addresses (X, Y), and an X address and a Y address of the frame memory 88 and one dot (=8 bit) of color image data written into the addresses (X, Y) are set. Setting to the frame memory register 80a is executed by the phone CPU 28. The address data and the image data for both of the frame memories 86 and 88 are set by the phone CPU 28 in the phone mode, and only the address data and the image data for the frame memory 86 are set by the phone CPU 28 in the game mode.

Figure 16:
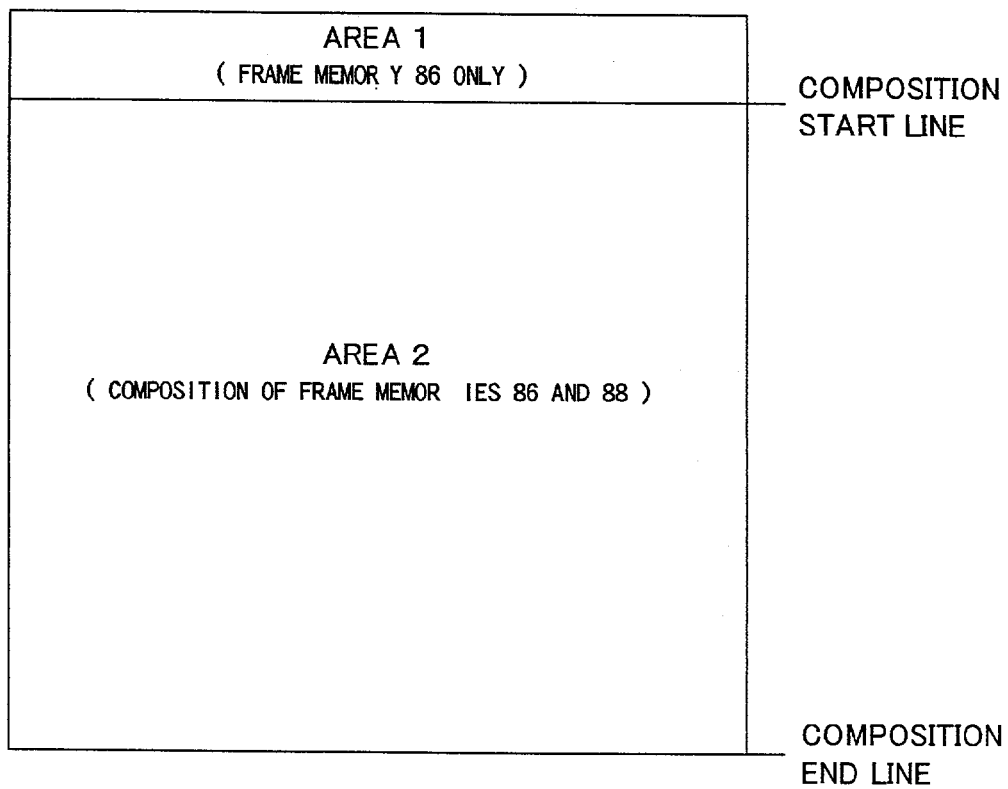
FIG. 16 is an illustrative view explaining an area formed on an LCD screen.
Figure 17:
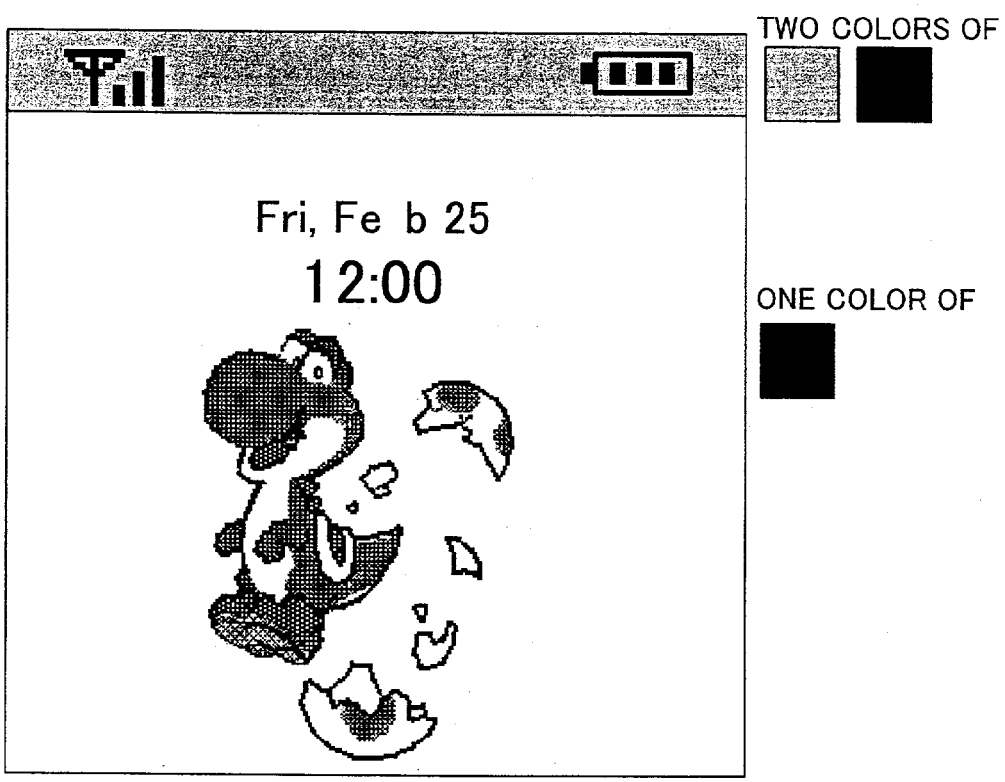
FIG. 17 is an illustrative view explaining a color displayed on the LCD screen.

The output control register 80b is a register for controlling an output of image data from the LCD controller 84 to the LCD 18, and composition start line data, composition end line data, image start line data and LCD control data are set thereto. Referring to FIG. 16 and FIG. 17, an image based on the image data drawn in the frame memory 86 is displayed on an area 1 forming the display screen, and a composite image based on the respective image data drawn in the frame memories 86 and 88 is displayed on an area 2 forming the display screen. The composition start line data and the composition end line data indicate a start position and an end position of the area 2, respectively. Meanwhile, the image start line data is data to designate from which line of the frame memory 88 reading-out of the color image data is started. A scroll display of a color image is made possible by renewing the image start line data per a predetermined number of lines.

The LCD control data is specifically displayed by 8 bits as shown in FIG. 14. The zero bit (=LCNT 0) is a mode selection flag, and "0" indicates the phone mode and "1" indicates the game mode. The first bit (=LCNT 1) is a flag to control an output/interruption of an image based on the binary image data drawn in the frame memory 86, and "0" indicates the interruption and "1" indicates the output. The second bit (=LCNT 2) is a flag to control whether or not blending is subjected to the color image when an image based on the color image data drawn in the frame memory 88 is displayed, and "0" indicates a normal and "1" indicates the blending. The fourth bit to the third bit (=LCNT 4, 3) are a flag to control an output and a tone (color tone) of the image based on the color image data drawn in the frame memory 88, and "00" indicates an interruption of the output, "01" indicates a tone down, "10" indicates an equalized tone and "11" indicates a tone up. The fifth bit (=LCNT 5) is a flag to control a display on/off state of the LCD 18, and "0" indicates the display off state and "1" indicates the display on state. The sixth and seventh bits are not utilized in the present invention.

The palette control register 80c is a register to designate a color of the image based on the binary image data drawn in the frame memory 86. Palette data 0 for specifying a background color and palette data 1 for specifying a character color are set with regard to the area 1 which is not a composition area. On the contrary, only the palette data 1 for specifying the character color is set with regard to the area 2 which is a composition area, and a background is always a transparent color.

The game CPU control register 80d has a game CPU start flag only. The game CPU start flag is set to "1" in response to an operation of the game start key 20, and set to "0" in response to an operation of the hold key 24b. The "1" indicates the game mode and the "0" indicates the phone mode.

The FIFO register 80e is a register to temporarily hold data corresponded between the game CPU 40 and the phone CPU 28 in the game mode. More specifically, it includes FIFO registers 1 and 2, each of which has a capacity of 64×16 bits. Since the phone CPU 28 of this embodiment is an 8 bit CPU, only 8 bits out of 16 bits are utilized. However, it is possible to respond to the phone CPU of 16 bits by setting the FIFO registers 1 and 2 to 16 bits.

The FIFO register 1 is used for data transmission from the game CPU 40 to the phone CPU 28, and the FIFO register 2 is used for data transmission from the phone CPU 28 to the game CPU 40. Accordingly, writing to the FIFO register 1 is executed only by the game CPU 40, and reading out from the FIFO register 1 is executed only by the phone CPU 28. Furthermore, writing to the FIFO register 2 is executed only by the phone CPU 28, and reading out from the FIFO register 2 is executed only by the game CPU 40. These FIFO registers 1 to 2 are utilized in assignment processing for assigning the start function and the select function to the * key 24d and the # key 24e, respectively, transmission processing of key information when the * key 24d or # key 24e is operated, clearing processing of the function assignment, and player's name input processing.

The game key register 80f is a register to hold data in relation to the game operation, and includes game key registers 2 and 3. The game key register 1 is provided in the key controller 80 as described above, and all of the game registers 1 to 3 are formed by 8 bits as shown in FIG. 15. The A button 22b is assigned to the zero bit (=K0, KI0, KO0), the B button 22c is assigned to the first bit (=K1, KI1, KO1), and the upper direction, the lower direction, the left direction and the right direction of the cross key 22a are assigned to the second bit to the fifth bit (K2~K5, K12~K15, KO2~KO5). The start key (* key 24d) is assigned to the sixth bit (=K6, KI6, KO6), and the select key (# key 24e) is assigned to the seventh bit.

The zero bit is renewed from "0" to "1" by operating the A button 22b, and the first bit is renewed from "0" to "1" by operating the B button 22c. The second bit is renewed from "0" to "1" when the cross key 22a is operated in the upper direction, and the third bit is renewed from "0" to "1" when the cross key 22a is operated in the lower direction. Furthermore, the fourth bit is renewed from "0" to "1" when the cross key 22a is operated in the left direction, and the fifth bit is renewed from "0" to "1" when the cross key 22a is operated in the right direction. In addition, the sixth bit is renewed from "0" to "1" when the * key 24d is operated, and the seventh bit is renewed from "0" to "1" when the # key 24e is pressed.

The interruption register 80g is a register to temporarily hold an interruption request corresponded between the game CPU 40 and the phone CPU 28. The interruption request generated from the game CPU 40 to the phone CPU 28 is set to an interruption register 1, and the interruption request from the phone CPU 28 to the game CPU 40 is set to an interruption register 2. It is noted that either the interruption generated from the phone CPU 28 to the game CPU 40 or the interruption from the game CPU 40 to the phone CPU 28 is utilized in the assignment processing to assign the start function and the select function to the * key 24d and the # key 24e, respectively, the transmission processing of key information when the * key 24d or the # key 24e is operated, the clearing processing of the function assignment, and the player's name input processing.

The key controller 82 and its periphery are constituted as shown in FIG. 9. In the game mode, the * key 24d functions as a start key, and the # key 24e functions as a select key as described above. A predetermined bit of the phone key register 28b is renewed to "1" when the operator operates the * key 24d or the # key 24e. The phone CPU core 28a determines which key is operated from the setting of the phone key register 28b, and then, renews the sixth bit of a game key register 3 to "1" when the * key 24d is operated, and renews the seventh bit of the game key register 3 to "1" when the # key 24e is operated.

The game key register 1 is set to a logical sum of a value corresponding to an operation of the game key 22 and a value outputted from the game key register 3. The game CPU core 50 inputs the setting of the game key register 1 and performs game processing according to the inputted setting. Accordingly, not only an operation of the game key 22 but also operations of the * key 24*d* and # key 24*e* are reflected on the game processing.

The setting of the game key register 1 is applied to the game key register 2, and therefore, the settings of the game key registers 1 and 2 always coincide with each other. Accordingly, the setting of the game key register 2 is changed in response to the operation of the game key 22. The phone CPU core 28*a* determines whether the A button 22*b* is operated or not from the setting of the game key register 2 upon inputting a player's name, and executes processing according to the result of the determination.

Returning to FIG. 8, the PPU 78 performs a process according to the palette data of the palette RAM 68 and the setting of the register 70 on the image data stored in the VRAMs 72 and 74, and outputs the 8 bits color image data thus processed to the LCD controller 84. However, it is only in the game mode that the background image data and the object image data are drawn in the VRAMs 72 and 74, and the PPU 78 transmits the color image data and the address data to the LCD controller 84 only in the game mode.

Figure 10:
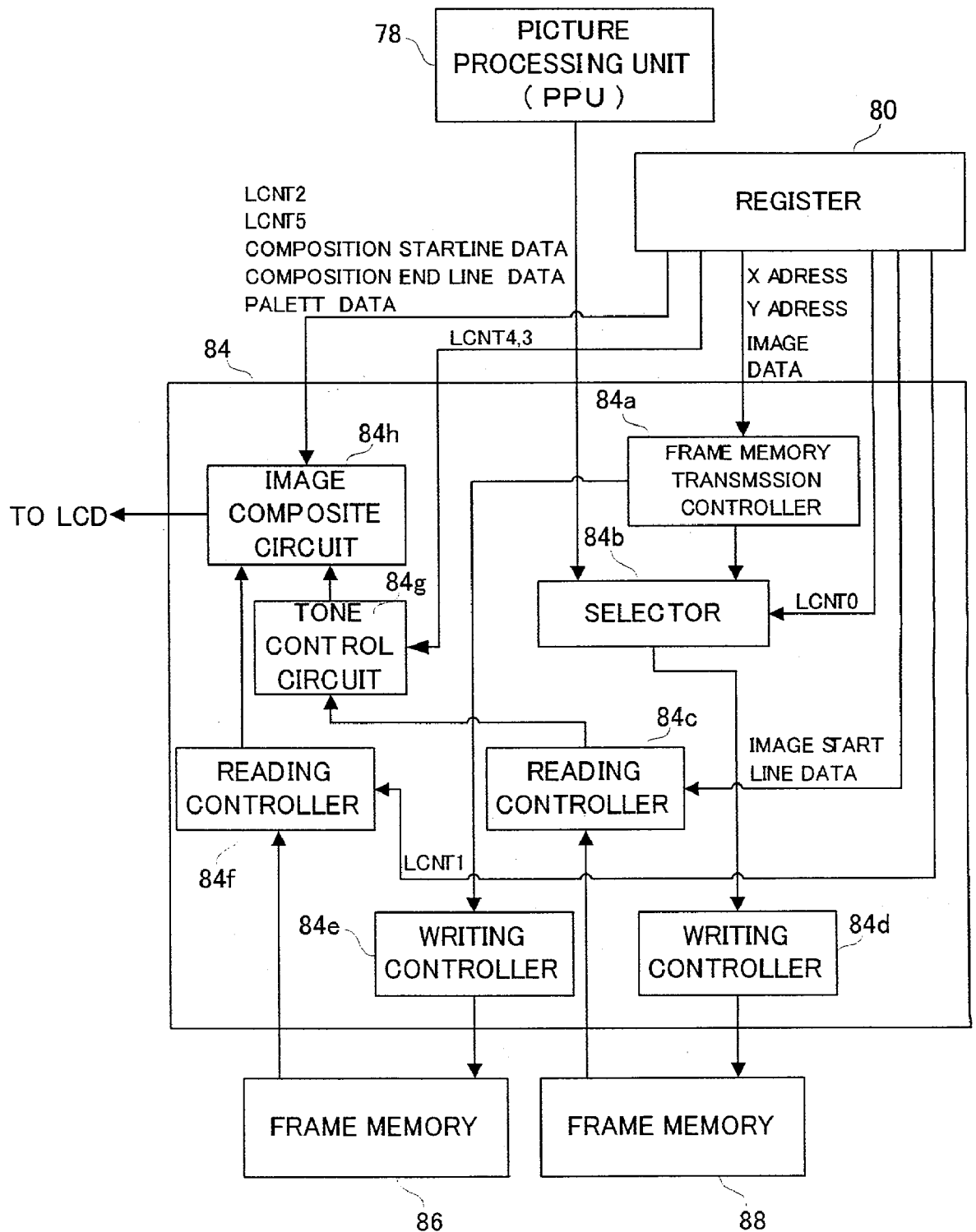
FIG. 10 is a block diagram showing a configuration of an LCD controller and its periphery.

The LCD controller 84 is constituted as shown in FIG. 10. Out of the LCD control data set in the output control register 80*b*, the LCNT0 is applied to a selector 84*b*, the LCNT 1 is applied to a reading controller 84*f*, the LCNTs 4 and 3 are applied to a tone control circuit 84*g*, and the LCNTs 2 and 5 are applied to an image composition circuit 84*h*. Furthermore, the composition start line data and the composition end line data set in the output control register 80*b* are applied to the image composition circuit 84*h*, and the image start line data is applied to a reading controller 84*c*.

In addition, the palette data 0 for the area 1, the palette data 1 for the area 1 and the palette data 1 for the area 2 set in the palette control register 80*c* are applied to the composition image circuit 84*h*, and the X address for the frame memory 86, the Y address for the frame memory 86, the one dot of binary image data, X address for the frame memory 88, the Y address for the frame memory 88, and the one dot of color image data set in the frame memory register 80*a* are applied to a frame memory transmission controller 84*a*.

As described above, the binary image data and its address data, and the color image data and its address data are set to the frame memory register 80*a* in the phone mode. At this time, the frame memory transmission controller 84*a* applies the binary image data and its address data to a writing controller 84*e* and applies the color image data and its address data to the selector 84*b*. The selector 84*b* selects the output of the frame memory transmission controller 84*a* when the LCNT 0 indicates "0" i.e. the phone mode. The color image data and the address data outputted from the frame memory transmission controller 84*a* are applied to the writing controller 84*d* through the selector 84*b*.

On the other hand, in the game mode, only the binary image data and its address data are set to the frame memory register 80*a*, and the frame memory transmission controller 84*a* applies the binary image data and the address data to the writing controller 84*e*. The color image data and the address data are applied from the PPU 78 to the selector 84*b*. The LCNT 0 of the LCD control data indicates "1" in the game mode, and the selector 84*b* selects an output from the PPU 78 at this time. Accordingly, the output from the PPU 78 is applied to the writing controller 84*d* via the selector 84*b* in the game mode.

As described later in detail, the address data indicates only a writing start address with regard to either the binary image data or color image data. Accordingly, either the writing controller 84*e* or 84*d* renews the writing address at every dot in reference to the applied address data, and writes to the renewed address the one dot of binary image data or the one dot of color image data which is sequentially applied. Thus, the binary image data and the color image data of a predetermined number of dots are stored in the frame memories 86 and 88, respectively.

It is noted that although either the frame memories 86 or 88 has a capacity capable of storing 160×160 dots of image data, 1 bit is assigned to each dot of the frame memory 86, and 8 bits are assigned to each dot of the frame memory 88. Accordingly, each address of the frame memory 86 is written with the one dot of binary image data, and each address of the frame memory 88 is written with the one dot of color image data.

The reading controller 84*f* reads the binary image data from the frame memory 86 and applies the read binary image data to the image composition circuit 84*h* when the LCNT 1 of the LCD control data indicates "1". On the other hand, the reading of the binary image data from the frame memory 86 is suspended when the LCNT 1 indicates "0". The reading controller 84*c* specifies a reading start line of the frame memory 88 by the image start line data and starts to read out the color image data from the specified reading start line. The read color image data is applied to the image composition circuit 84*h* through the tone control circuit 84*g*.

The tone control circuit 84*g* executes a tone control or an output control in response to the values of the LCNTs 4 and 3 as follows. Specifically, if the LCNTs 4, 3 indicates "01", an RGB level of the color image data is decreased (tone down), and the color image data of which tone is down is applied to the image composition circuit 84*h*. Furthermore, if the LCNTs 4 and 3 indicates "11", the RGB level of the color image data is increased (tone up), and the color image data of which tone is up is applied to the image composition circuit 84*h*. In addition, if the LCNTs 4 and 3 indicates "10", the color image data is applied to the image composition circuit 84*h* as it is, and if the LCNTs 4 and 3 indicates "00", the output of the color image data to the image composition circuit 84*h* is suspended.

Figure 11:
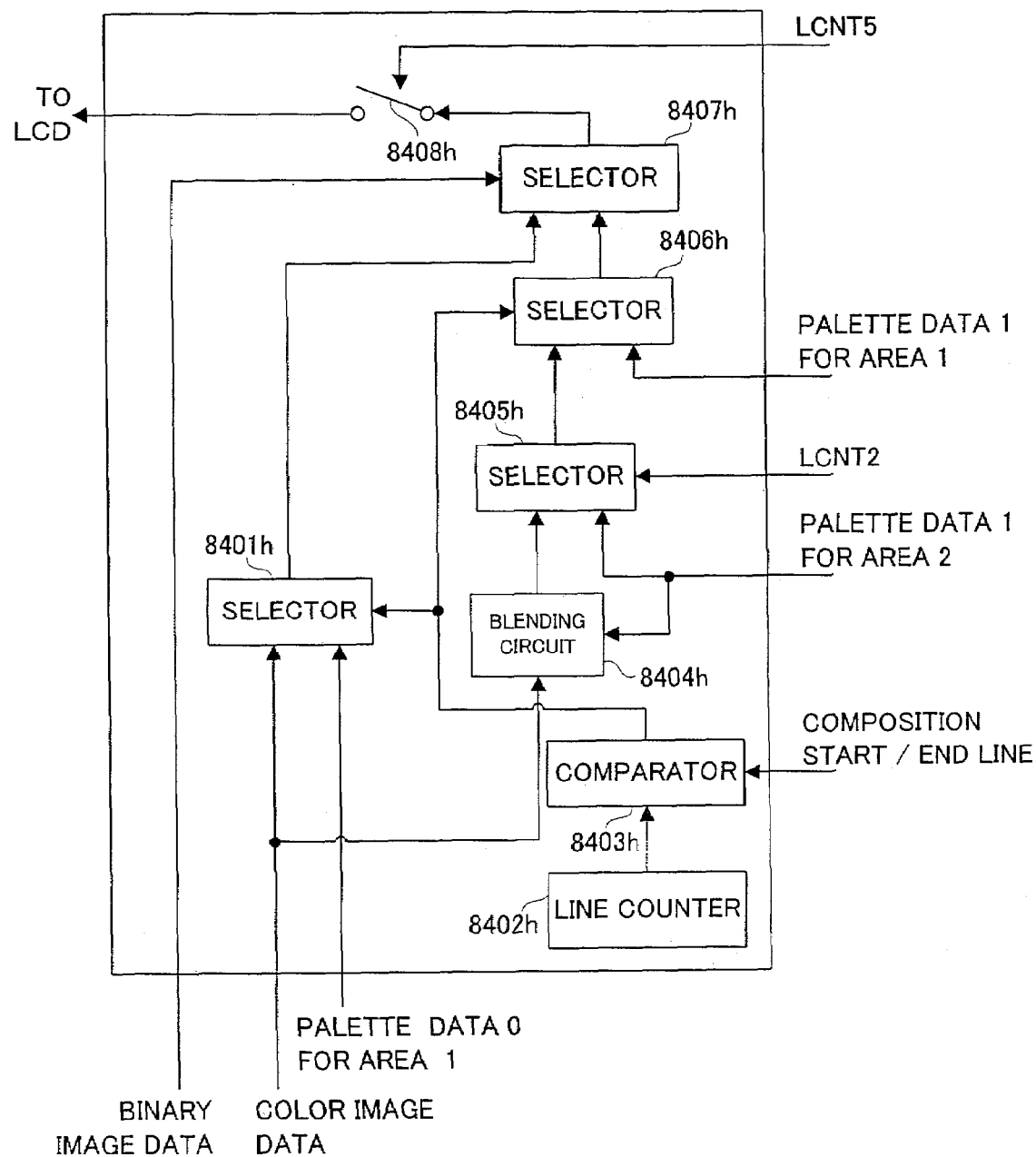
FIG. 11 is a block diagram showing a configuration of an image composite circuit.

The image composition circuit 84*h* is constituted as shown in FIG. 11. A line counter 8402*h* counts the number of lines forming one frame and applies the counted value to a comparator 8403*h*. The comparator 8403*h* is also supplied with the composition start line data and the composition end line data set in the output control register 80*b*. The comparator 8403*h* changes the output to the high level when the counted value of the line counter 8402*h* coincides with a data value of the composition start line data, and restores the output from the high level to the low level when the counted value of the line counter 8402*h* coincides with the data value of the composition end line data+1. Accordingly, the output of the comparator 8403*h* becomes low in level from the start position to the end position of the area 1 shown in FIG. 16 and becomes high in level from the start position to the end position of the area 2 shown in FIG. 16.

A selector 8401*h* selects the palette data 0 for the area 1 set in the palette control register 80*c* when the output of the comparator 8403*h* is low in level, and selects the color image data outputted from the tone control circuit 84*g* when the output of the comparator 8403*h* is high in level. The output of the selector 8401*h* is applied to a selector 8407*h*.

A blending circuit 8404*h* performs a blending process on the palette data 1 for the area 2 set in the palette control register 80*c* and the color image data outputted from the tone control circuit 84*g*. A selector 8405*h* selects the palette data 1 for the area 2 when the LCNT 2 of the LCD control data indicates "0", and selects the output of the blending circuit 8404*h* when the LCNT 2 indicates "1". The output of the selector 8405*h* is applied to a selector 8406*h*. The output of the comparator 8403*h* is also applied to the selector 8406*h*. The selector 8406*h* selects the palette data 1 for the area 1 set in the palette control register 80*c* when the output of the comparator 8403*h* is low in level, and selects the output of the selector 8405*h* when the output of the comparator 8403*h* is high in level.

The selector 8407*h* receives the binary image data read out by the reading controller 84*f*, and selects anyone of the selectors 8401*h* and 8406*h* according to a data value of each dot forming the binary image data (bit value). More specifically, the output of the selector 8401*h* is selected when the bit value indicates "0", and the output of the selector 8406*h* is selected when the bit value indicates "1".

A switch 8408*h* is in an off state when the LCNT 5 of the LCD control data indicates "0" and is in an on state when the LCNT 5 indicates "1". Accordingly, only when the LCNT 5 indicates "1", the output of the selector 8407*h* is applied to the LCD 18 via the switch 8408*h*.

In the area 1, the selector 8401*h* selects the palette data 0 for the area 1, and the selector 8406*h* selects the palette data 1 for the area 1. The selector 8407*h* selects the palette data 0 for the area 1 when each bit value of the binary image data is "0" and selects the palette data 1 for the area 1 when each bit value indicates "1". As a result, the characters indicative of the receiving condition and the remaining amount of the battery are displayed on the area 1 as shown in FIG. 17.

In the area 2, the selector 8401*h* selects the color image data, and the selector 8406*h* selects the output of the selector 8405*h*. When not performing the blending process, the palette data 1 for the area 2 is applied from the selector 8405*h* to the selector 8406*h*. The selector 8407*h* selects the color image data when each bit value of the binary image data is "0" and selects the palette data 1 for the area 2 when each bit value indicates "1". As a result, the characters indicative of the date and the current time and the color image are displayed on the area 2 as shown in FIG. 17.

Figure 18:
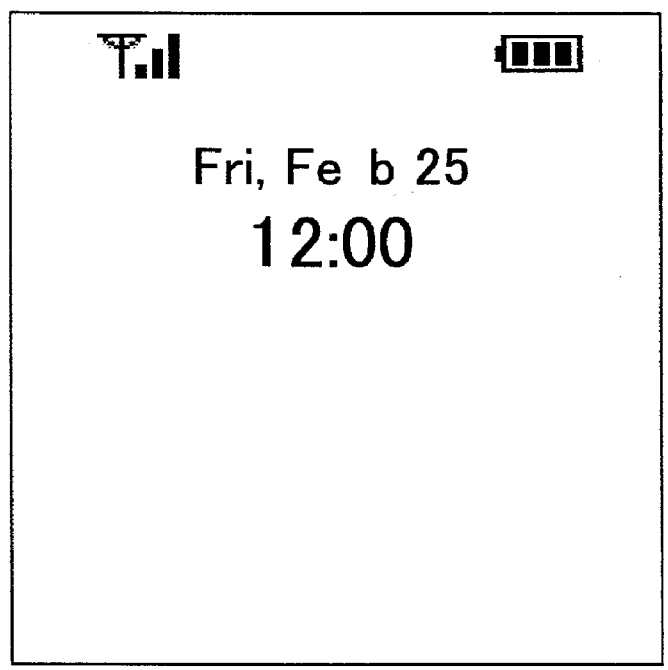
FIG. 18 is an illustrative view showing one example of binary image data drawn in a frame memory 86.
Figure 19:
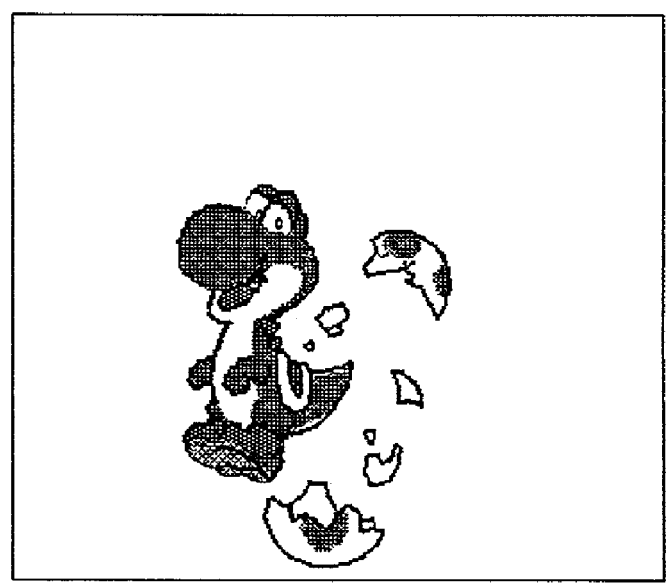
FIG. 19 is an illustrative view showing one example of color image data drawn in a frame memory 88.

The incoming call stand-by screen shown in FIG. 2 is formed by the binary image data indicative of the receiving state, the remaining amount of the battery, the date, and the current time shown in FIG. 18 and the color image data indicative of the game character shown in FIG. 19. The phone CPU 28 shown in FIG. 7 sets the address data corresponding to a head of the area 1 into the frame memory register 80*a*, and sets the binary image data indicative of the date and the current time (display at the area 1) into the frame memory register 80*a* dot by dot. Successively, the phone CPU 28 sets the address data corresponding to a head of the area 2 into the frame memory register 80*a* and sets the binary image data indicative of the date and the current time (display at the area 2) into the frame memory register 80*a* dot by dot. The LCD controller 84 repeatedly reads the binary image data renewed dot by dot from the frame memory register 80*a* and writes the read binary image data of each dot to the frame memory 86 based on the address data. Thus, the binary image data shown in FIG. 18 is obtained in the frame memory 86.

The phone CPU 28 sets the address data corresponding to the head of the area 2 and the color image data of each dot indicative of the game character into the frame memory register 80*a* following the setting of the binary image data. The LCD controller 84 repeatedly reads the color image data renewed dot by dot from the frame memory register 80*a* and writes the read color image data to the frame memory 88 based on the address data. Thus, the color image data shown in FIG. 19 is obtained in the frame memory 88.

The LCD controller 84 performs, based on the settings of the output control register 80*b* and the palette control register 80*c*, reading the binary image data and the color image data from the frame memories 86 and 88, a tone control of the color image data, a coloring based on the binary image data, a composition of the binary image data and the color image data, and an output of the composite image data. As a result, the stand-by screen shown in FIG. 2 is displayed on the LCD 18.

If the operator performs a dialing operation, the phone CPU 28 sets the address data corresponding to the head of the area 2 and the binary image data indicative of the telephone number of the opponents into the frame memory register 80*a*. The LCD controller 84 writes the binary image data to the frame memory 86 in the same manner as the above description. Accordingly, the binary image data indicative of the date and the current time is renewed by the binary image data indicative of the telephone number of the opponent. As a result, the date and the current time displayed on the LCD 18 is also switched to the telephone number of the opponent.

The phone CPU 28 also establishes connection with the opponent through the transmitting receiving circuit 32 and the antenna 14. When the connection is established, sound data of the opponent is received, and the received sound data is outputted from the speaker 16 via the sound codec 30. Furthermore, sound data of the operator taken by the microphone 26 is outputted from the antenna 14 via the sound codec 30 and the transmitting and receiving circuit 32.

On the other hand, if there is the incoming call through the antenna 14 and the transmitting receiving circuit 32, the phone CPU 28 sets the address data corresponding to the head of the area 2 and the binary image data indicative of the incoming call message and the telephone number of the transmission source into the frame register 80*a*. The LCD controller 84 writes the binary image data to the frame memory 86, whereby the binary image data indicative of the date and the current time is renewed by the binary image data indicative of the incoming call message and the telephone number of the transmission source. Thus, the date and the current time displayed on the LCD 18 are also renewed to the incoming call message and the telephone number of the transmission source. Furthermore, the phone CPU 28 applies ring tone data to the speaker 48 through the adder 46. The ring tone is outputted from the speaker 48.

If the operator herein performs a receiving operation, the phone CPU 28 stops the output of the ring tone data, and establishes the connection with the transmission source. After the connection is established in the same manner as the above description, the sound data of the opponent is outputted from the speaker 16 via the sound codec 30, and the sound data of the operator taken in by the microphone 26 is outputted from the antenna 12 through the sound codec 30 and the transmitting receiving circuit 32.

If the operator operates the game start key 20 in the incoming call stand-by state, the phone CPU 28 sets the game start flag. Furthermore, the phone CPU 28 sets into the frame memory register 80*a* the address data corresponding to the head of the area 2 and the binary image data in which all dots indicate "0", and sets "1" into the LCNT 0 of the LCD control data. The LCD controller 84 writes the binary image data in which all dots indicate "0" into the frame memory 86 based on the address data, and selects the PPU 78 as an input destination of the color image data.

Figure 20:
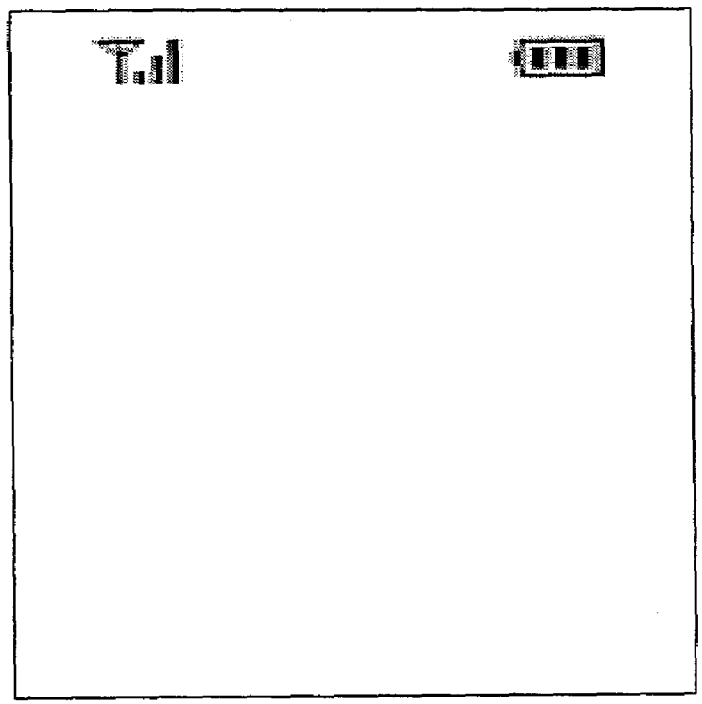
FIG. 20 is an illustrative view showing another example of the binary image data drawn in the frame memory 86.
Figure 21:
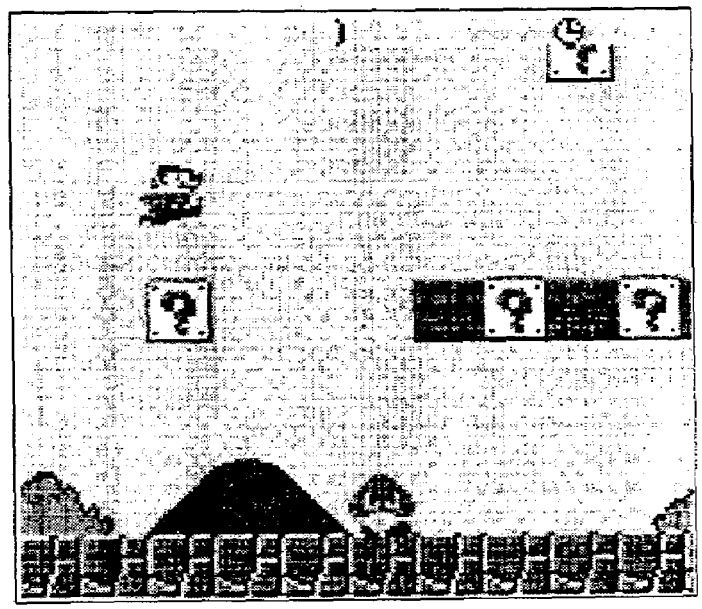
FIG. 21 is an illustrative view showing another example of the color image data drawn in the frame memory 88.
Figure 22:
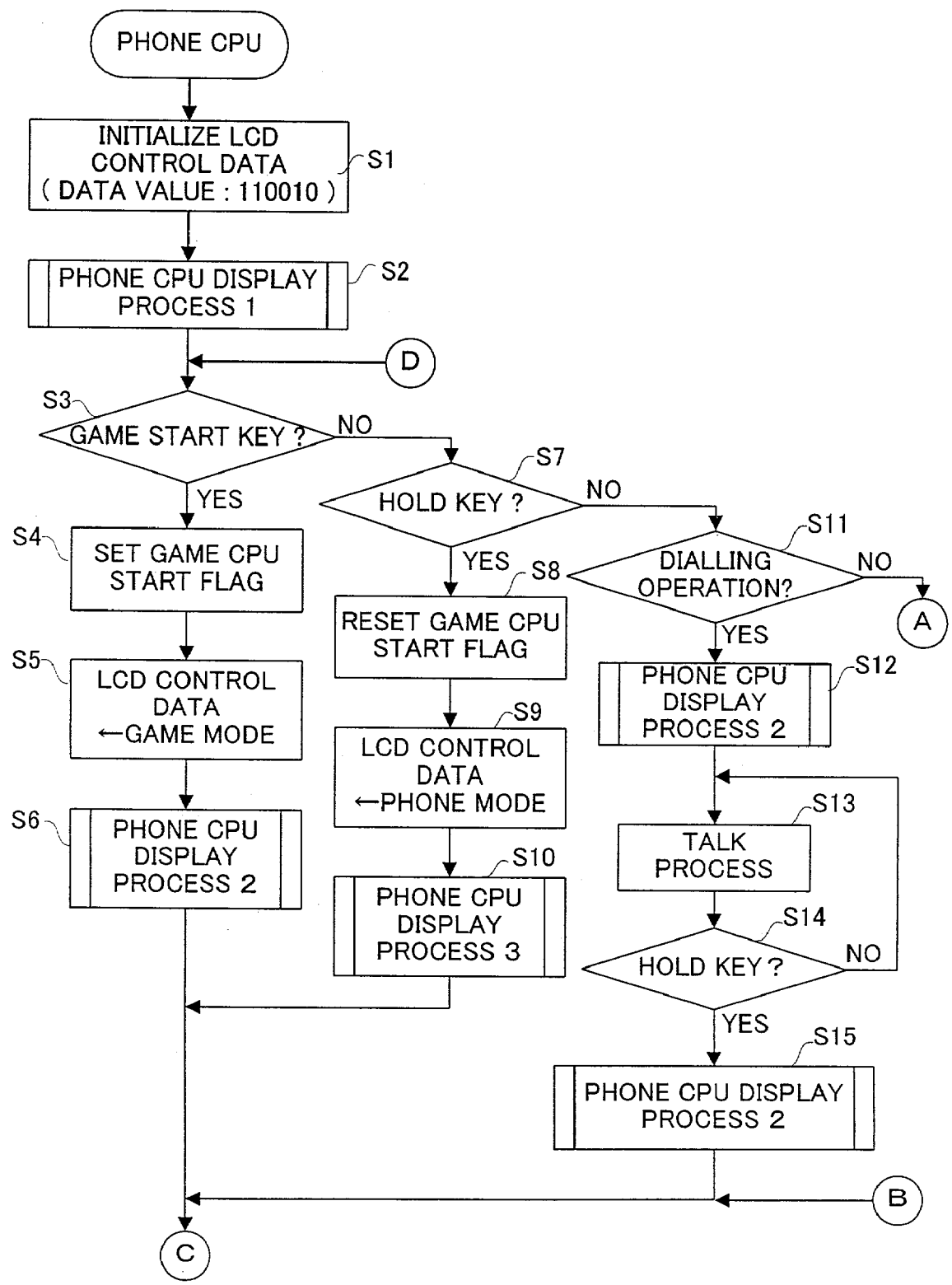
FIG. 22 is a flowchart showing a part of an operation of a phone CPU core.

On the other hand, the game CPU core 50 draws the background image data and the object image data forming the game screen (color image) in the VRAMs 72 and 74 respectively, and sets the palette data of the static character and the dynamic character into the color palette RAM 68. Furthermore, the attribute of the dynamic character is set into the OAM 76 and the settings with respect to the output of the background and the object are set into the register 70. As a result, the color image data shown in FIG. 21, for example, is formed by the PPU 78, and outputted to the LCD controller 84. The LCD controller 84 writes the color image data outputted from the PPU 78 to the frame memory 88. The frame memories 86 and 88 are stored with the binary image data shown in FIG. 20 and the color image data shown in FIG. 21, respectively.

The LCD controller 84, in such a manner as the above description, reads the binary image data and the color image data from the frame memories 86 and 88, performs the tone control according to the values of the LCNTs 4, 3 of the LCD control data, and composites the palette data with the color image data on the basis of the binary image data, the composition start line data and the composition end line data. As a result, the game screen shown in FIG. 4 is displayed on the LCD 18.

The game CPU core 50 also applies a key code indicative of the * key 24*d* and the # key 24*e* and function information assigned to the * key 24*d* and the # key 24*e* to the phone CPU 28 through the FIFO register 1 shown in FIG. 9. Herein, the function information assigned to the * key 24*d* indicates "START", and the function information assigned to the # key 24*e* indicates "SELECT". Accordingly, the phone CPU 28 sets "1" into the start key bit KO6 of the game key register 3 when the * key 24*d* is operated and sets "1" into the select key bit KO7 of the game key register 3 when the # key 24*e* is operated. Each bit of the game key register 1 is set with logical sum of the value corresponding to the operation of the game key 22 and the value outputted from the game key register 3. The game CPU core 50 performs the game processing according to the setting of the game key register 1.

After the game is started, in response to an operation of the game key 22, the background image data, the object image data, and the attribute of the object are renewed, and furthermore, the settings of the color palette register 68 and the register 70 are renewed. As a result, the color image data outputted from the picture processing unit 78, is also changed, and therefore, movements are generated on the game screen. On the other hand, the effect sound data is outputted from the SPU 64 as necessary, and the effect sound is generated from the speaker 48.

If the * key 24*d* is operated during the progress of the game, the game CPU 50 causes the SPU 64 and the PPU 78 to stop outputting the BGM data and the color image data so as to shift to the pause state. Therefore, the output of the BGM and the movements of the game screen are stopped. If the * key 24*d* is operated again, the game CPU 50 makes the SPU 64 and the PPU 78 resume the output of the BGM data and the color image data so as to cancel the pause state. The BGM is outputted from the speaker 48 again, and the game screen on the LCD 18 also starts to move again.

It is noted that in a case the menu screen is displayed during the progress of the game, the game CPU core 50 changes the setting of the register 70 in response to an operation of the #key 24*e*. The setting to be changed is a setting relating to the cursor displayed on the menu screen, and the display position of the cursor is changed due to the change.

If there is the incoming call during the game, the phone CPU 28 sets "1" into the start key bit KO6 of the game key register 3 in addition to the above-described processing, and sets "11" into the LCNTs 4 and 3 of the LCD control data. Furthermore, the phone CPU 28 sets the binary image data indicative of the incoming call message and the telephone number of the transmission source and the address data corresponding to the head of the area 2 into the frame memory register 80*a* and applies the ring tone data to the speaker 48 via the adder 46. On the other hand, the game CPU core 50 makes the SPU 64 stop outputting the BGM to the SPU 64 and stops its own process so as to pause the game.

The LCD controller 84 stores the binary image data set in the frame memory register 80*a* to the frame memory 86. Furthermore, the LCD controller 84 respectively reads the binary image data and the color image data from the frame memories 86 and 88, performs the torn up processing on the color image data, and composites the palette data with the color image data on the basis of the binary image data, the composition start line data and the composition end line data. As a result, the incoming call guide screen shown in FIG. 5 is displayed on the LCD 18, and the output of the speaker 48 is switched from the BGM to the ring tone.

If the operator performs the receiving operation, the phone CPU 28 stops the output of the ring tone data and establishes the connection with the transmission source as described above. After the connection is established, the sound data of the opponent is outputted from the speaker 16 through the sound codec 30, and the sound data of the operator taken in by the microphone 26 is outputted from the antenna 14 via the sound codec 30 and the transmitting receiving circuit 32.

After finishing a communication, the phone CPU 28 restores the LCNTs 4 and 3 of the LCD control data to "10", and sets the address data corresponding to the head of the area 2 and the binary image data in which all dots indicate "0" into the frame memory register 80*a*. As a result, the display of the LCD 18 returns to the game screen shown in FIG. 4. It is noted the movements of the game screen have been stopped, and furthermore, the output of the BGM has been stopped. That is, the game retains the pause state. The pause state is canceled in response to an operation of the * key 24*d* by the operator.

More specifically, the phone CPU core 28*a* performs processing according to flowcharts shown in FIGS. 22 to 31 and FIGS. 34 and 35. First, the LCD control data set in the LCD control register 80*c* is set to an initial value "110010" in a step S1. That is, the LCD display on/off flag shown in FIG. 14 is set to "1", the color image tone control flag is set to "10", the color image blending control flag is set to "0", the binary image output control flag is set to "1", and the mode selection flag is set to "0".

Figure 25:
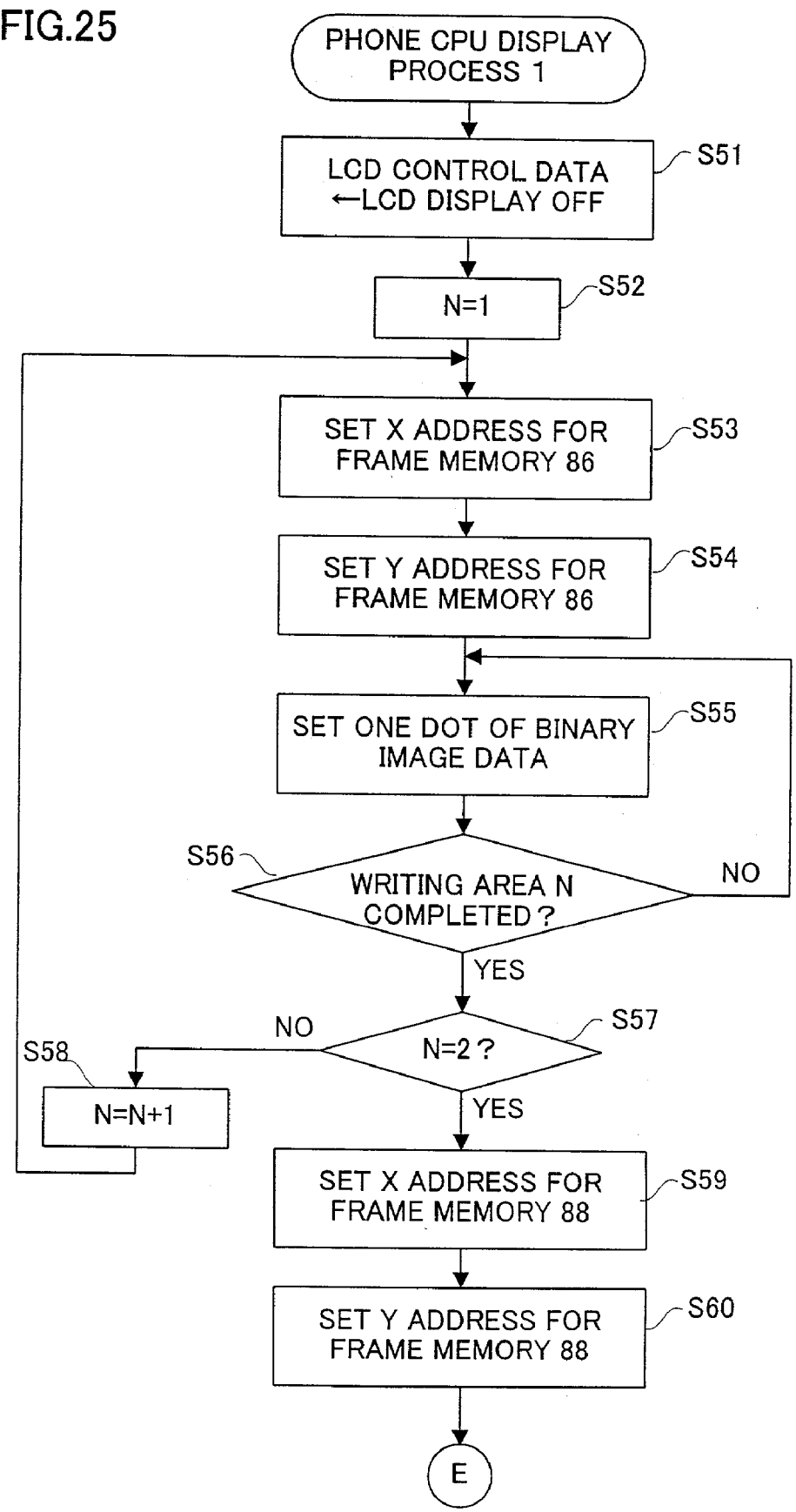
FIG. 25 is a flowchart showing further part of the operation of the phone CPU core.
Figure 26:
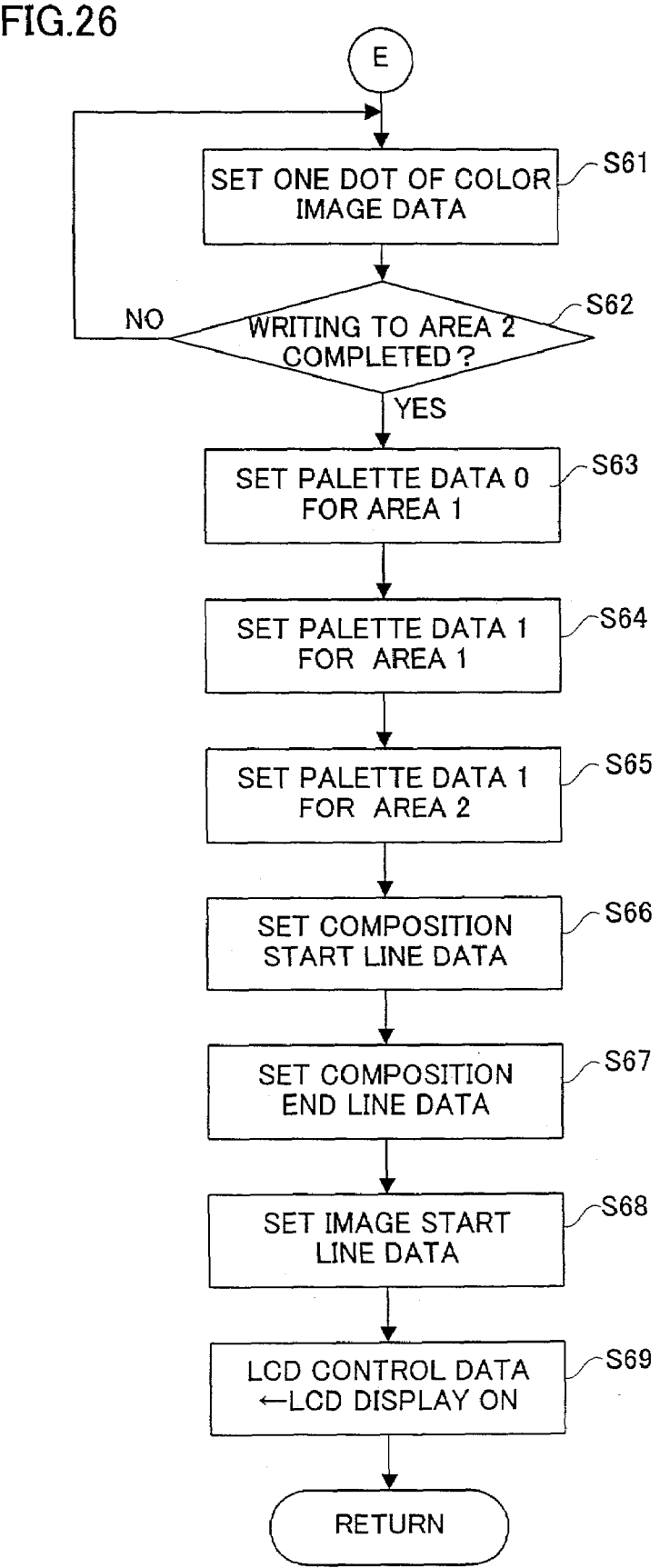
FIG. 26 is a flowchart showing another part of the operation of the phone CPU core.

In a following step S2, subroutines shown in FIGS. 25 and 26 are processed so as to display the incoming call stand-by screen shown in FIG. 2. First, the LCNT 5 of the LCD control data is renewed to "0" in a step S51 shown in FIG. 25, whereby the display of the LCD 18 is in an off state. Then, a counted value N is set to "0" in a step S52, and the X address for the frame memory 86, the Y address for the frame memory 86 and the one dot of binary image data are set in the frame memory register 80a, respectively in steps S53, 54, and 55. More specifically, the head address of an area N formed in the frame memory 86 (corresponding to the area N on the display screen) and the one dot of binary image data to be written to the head address are set to the frame memory register 80a. It is determined whether or not the writing of the binary image data to the area N is completed in a following step S56. If "NO" is determined, the process of the step S55 is repeated, and if "YES" is determined, the process proceeds to a step S57.

The LCD controller 84 first reads the head address data and the binary image data set in the frame memory register 80a, and writes the binary image data to the address indicated by the head address in the frame memory 86. In completion of the writing of one dot of binary image data, the LCD controller 84 renews the address of a writing destination by itself. Accordingly, there is no need to renew the writing address on the phone CPU 28 side, and the binary image data is written to desired addresses in the frame memory 86 only by repeating the setting process of the binary image data in the step S55.

It is determined whether the counted value N reaches "2" or not in the step S57, and if "NO" is determined, the counted value N is incremented in a step S58, and then the processing of the steps S53 to S56 is repeated. Thus, the binary image data indicative of the characters of the receiving state and the remaining amount of the battery is drawn in the area 1 of the frame memory 86, and the binary image data indicative of the date and the current time is drawn in the area 2 of the frame memory 86. It is noted that although the image data of the whole screen is rewritten in this embodiment, only the area of image data required to change may be rewritten. (The same is applied to steps S59 to S62 relating to the area 2 described later.) If "YES" is determined in the step S57, the X address for the frame memory 88, the Y address for the frame memory 88 and the one dot of color image data are set to the frame memory register 80a, respectively in the following steps S59, S60 and S61. The X address and the Y address set in the steps S59 and S60 indicate the head address in the frame memory 88, and the one dot of color image data set in the step S61 is image data to be written to the head address. It is determined whether or not the writing of the color image data to the area 2 is completed in the step S62, and if "NO" is determined, the process of the step S61 is repeated. Therefore, the color image data of the game character shown in FIG. 2 is drawn in the frame memory 88.

If "YES" is determined in the step S62, the palette data 0 for the area 1, the palette data 1 for the area 1, and the palette data 1 for the area 2 are set in the palette control register 80c in steps S63, S64, and S65, respectively. Whereby, the background color and the text color (character color) of the binary image displayed on the area 1 of the LCD18 and the text color of the binary image displayed on the area 2 are determined. It is noted that the background color of the binary image on the area 2 is transparent as described above.

The composition start line data, the composition end line data, and the image start line data are set in the output control register 80c in steps S66, S67, and S68, respectively. The composition start line data indicates from which line of the binary image the composition of the color image is started, the composition end line data indicates at which line of the binary image the composition of the color image is completed, and the image start line data indicates from which line of the frame memory 88 the reading is started.

In completion of the process of the step S68, the process proceeds to a step S69, and the LCNT5 of the LCD control data is set to "1" so as to turn the display of the LCD 18 on. Therefore, the incoming call stand-by screen shown in FIG. 2 is displayed on the LCD 18.

Figure 27:
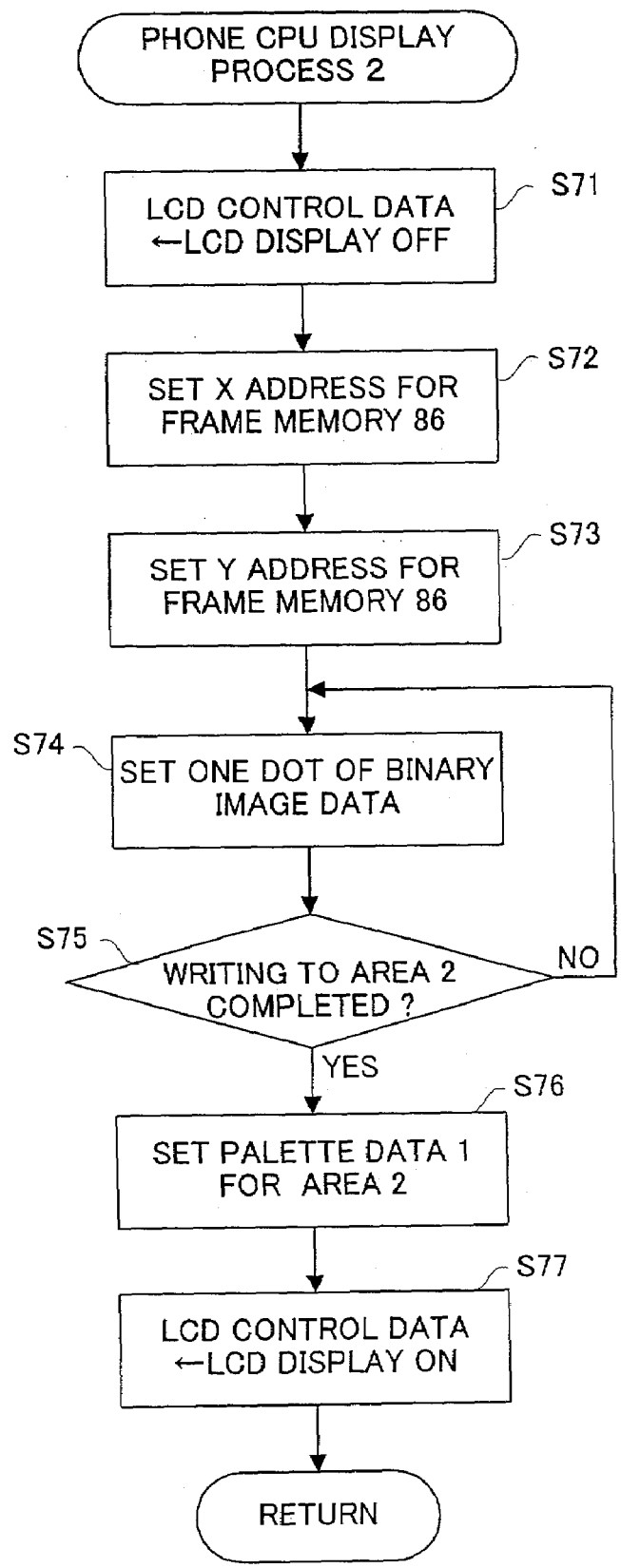
FIG. 27 is a flowchart showing the other part of the operation of the phone CPU core.

Returning to FIG. 22, they are determined whether or not the game start key 20 is operated, whether or not the hold key 24b is operated, whether or not a dialing operation is performed, and whether or not an incoming call of a phone occurs in steps S3, S7, S11 and S16, respectively. If the game start key 20 is operated, "YES" is determined in the step S3, and the game CPU start flag shown in FIG. 13 is set in a step S4, and then the LCNT 0 of the LCD control data is set to "1" in a step S5. Therefore, the game mode is started. When the process of the step S5 is completed, a subroutine shown in FIG. 27 is processed in a step S6.

First, the LCNT5 of the LCD control data is renewed to "0" in a step 871 so as to turn the display of the LCD 18 off. Next, the X address for the frame memory 86 and the Y address for the frame memory 86 are set to the frame memory register 80a in steps 872 and S73. The address set herein indicates the head address of the area 2 formed. The one dot of binary image data is set to the same frame memory register 80a in a step 874, and it is determined whether or not the writing of the binary image data to the area 2 is completed in a following step S75. Then, if "NO" is determined, the process of the step 874 is repeated, and if "YES" is determined, the palette data 1 for the area 2 is set to the palette control register 80c in a step S76, and the LCNT5 of the LCD control data is restored to "1" in a step S77 so as to turn the display of the LCD 18 on. The processing of the subroutine of the step S6 enables the writing of the binary image data in which all dots indicate "0" to the area 2 of the frame memory 86. As a result, the date and the current time displayed on the incoming call stand-by screen are erased.

If the hold key 24b is operated, "YES" is determined in the step S7, and the game CPU start flag is reset in a step S8, and then, "0" is set to the LCNT0 of the LCD control data in a step S9. Thus, the phone mode is started. In completion of the processing in the step S9, subroutines shown in FIGS. 28 and 29 are processed in a step S10 so as to display the incoming call stand-by screen on the LCD 18.

Figure 28:
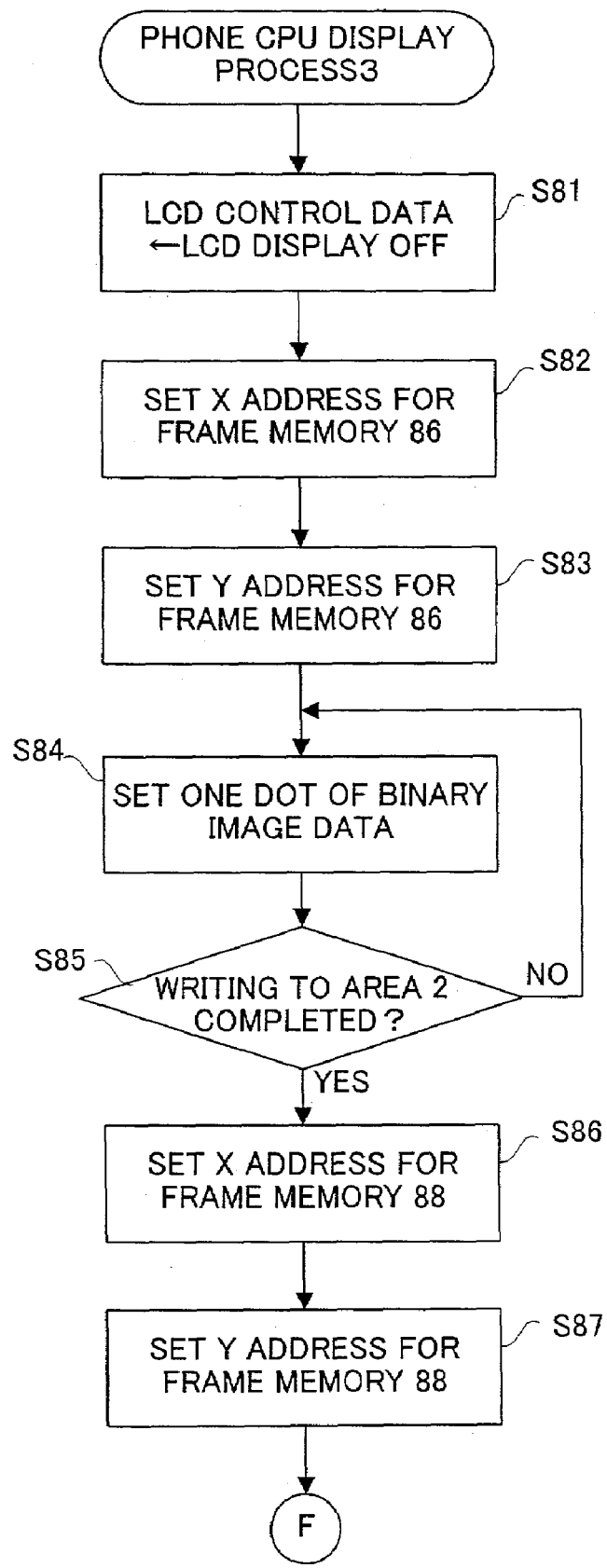
FIG. 28 is a flowchart showing further part of the operation of the phone CPU core.
Figure 29:
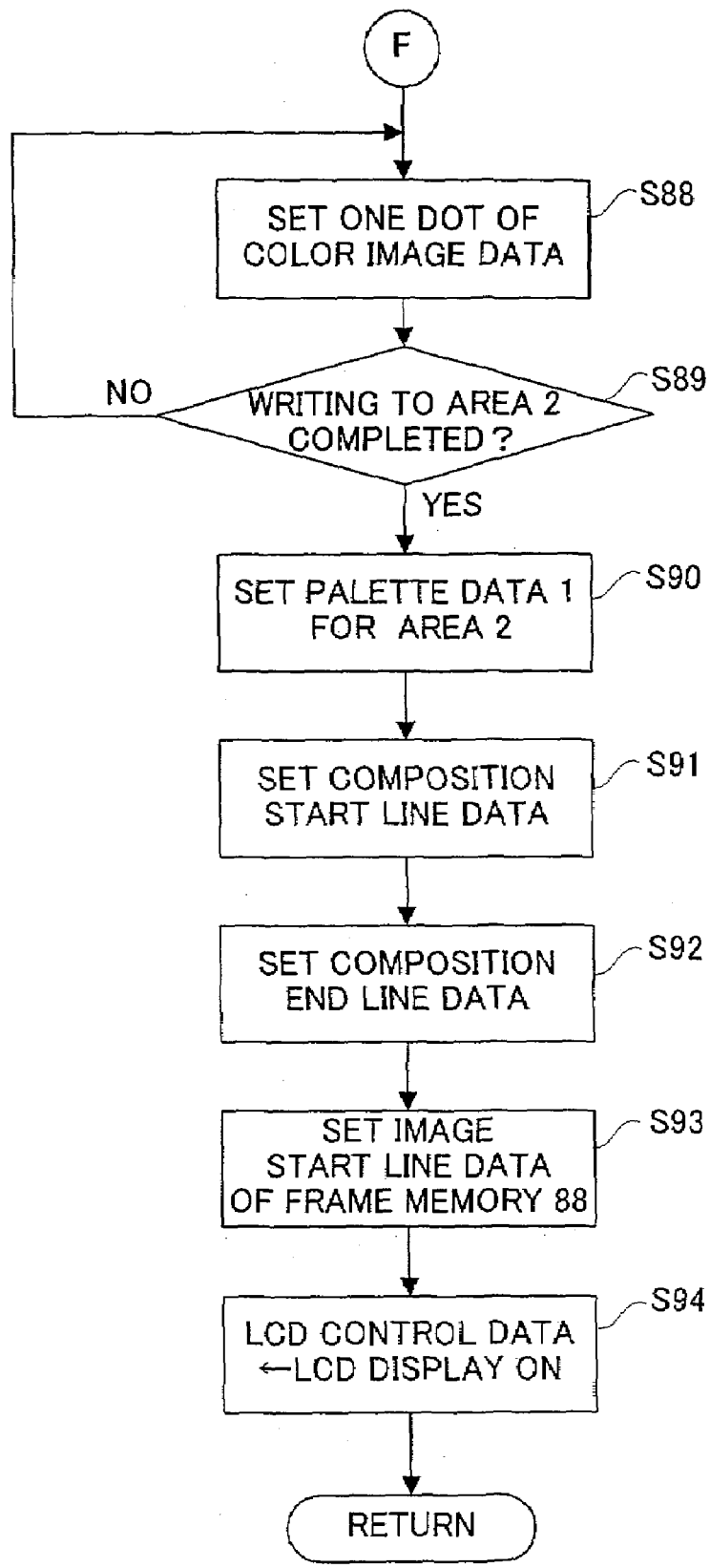
FIG. 29 is a flowchart showing another part of the operation of the phone CPU core.

First, the LCNT5 of the LCD control data is renewed to "0" in a step S81 shown in FIG. 28 so as to turn a display of the LCD 18 off. Next, the X address for the frame memory 86, the Y address for the frame memory 86 and the one dot of binary image data are set to the frame memory register 80a in steps S82, S83, and S84, respectively. The address data set in the steps S82 and S83 is the head address of the area 2 formed in the frame memory 86, and the binary image data set in the step S84 is data to be written to the head address. It is determined whether or not the writing of the binary image data to the area 2 is completed in a step S85, and the process of the step S84 is repeated until determination of "YES" is obtained. Thus, the binary image data of the date and the current time forming the incoming call stand-by screen are written to the area 2.

The X address for the frame memory 88, the Y address for the frame memory 88 and the one dot of color image data are set to the frame memory register 80a in following steps S86, S87 and S88. The X address and the Y address respectively set in the steps S86 and 87 indicate the head address of the area 2 formed in the frame memory 88, and the one dot of color image data set in the step S88 is image data to be written to the head address. It is determined whether or not the writing of the color image data to the area 2 is completed in a step S89, and if "NO" is determined, the process of the step S88 is repeated. Thus, the color image data of the game character forming the incoming call stand-by screen is drawn in the frame memory 88.

If "YES" is determined in the step S89, the palette data 1 for the area 2 is set to the palette control register 80c in a step S90, and the composition start line data, the composition end line data, and the image start line data are set to the output control register 80b in steps S91, S92 and S93, respectively. The LCNT5 of the LCD control data is restored to "1" in a step S94. Thus, the incoming call stand-by screen shown in FIG. 2 is displayed on the LCD 18.

If the dialing operation is executed, "YES" is determined in the step S11, and the subroutine shown in FIG. 27 is processed in a step S12. It is noted that the binary image data drawn in the frame memory 86 at this time is image data indicative of the phone number of the opponent. Accordingly, the phone number of the opponent is displayed on the LCD 18 instead of the date and the current time. When the processing in the step 12 is completed, communication processing is executed in a step 13, and it is determined whether or not the hold key 24b is operated in a step 14. Then, as long as the hold key 24b is not operated, the processing in the step 13 is repeated, and when the hold key 24b is operated, the subroutine shown in FIG. 27 is processed again in a step S15. At this time, the binary image data indicative of the date and the current time is drawn in the frame memory 86, and therefore, the display of the LCD 18 is renewed to the date and the current time from the phone number of the opponent.

Figure 23:
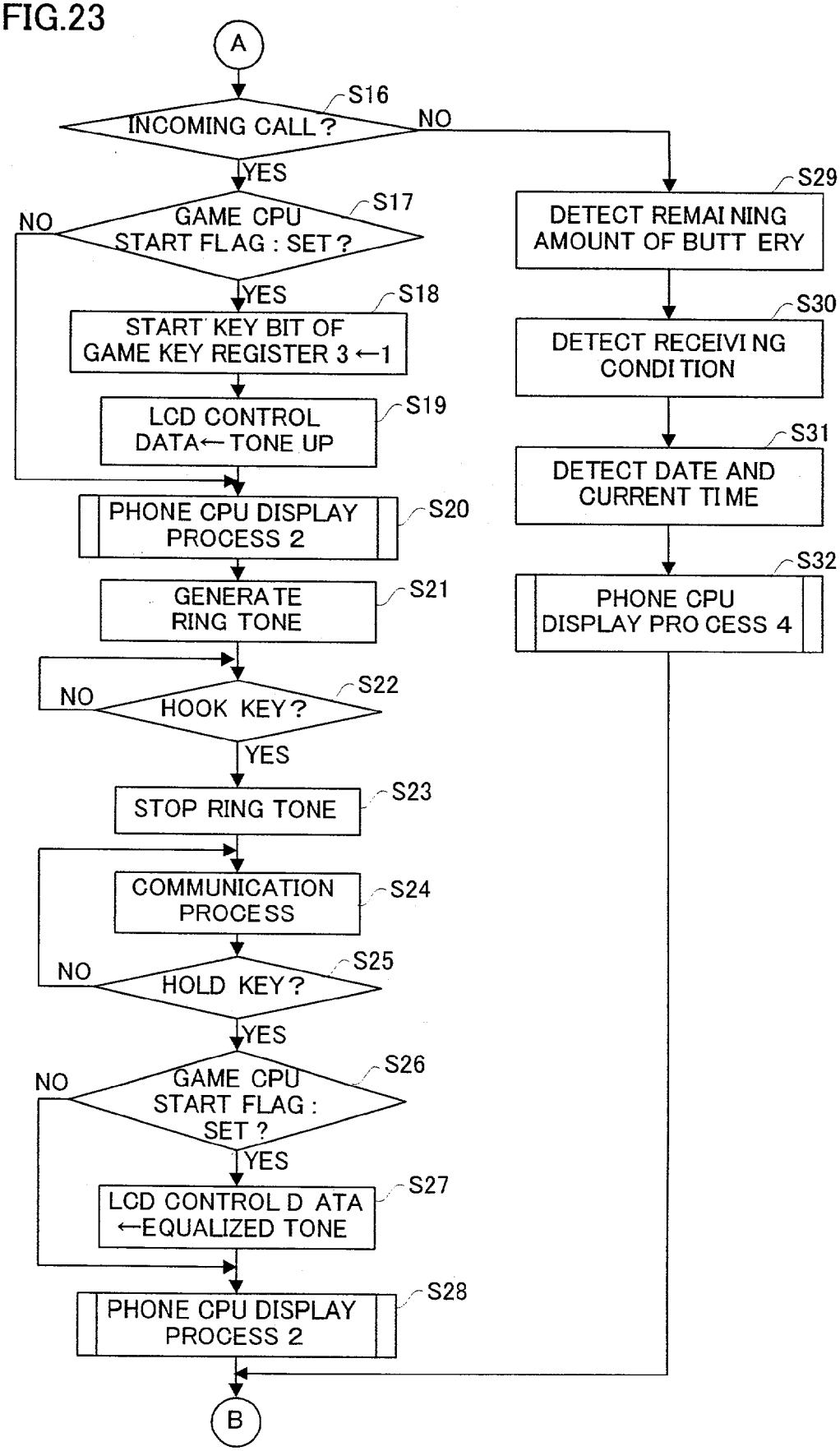
FIG. 23 is a flowchart showing another part of the operation of the phone CPU core.

If it is determined the incoming call of the phone occurs in a step S16 shown in FIG. 23, a state of the game CPU start flag is determined in a step S17. If the game CPU start flag is in a reset state, the process directly proceeds to a step S20. On the other hand, if the game CPU start flag is in a set state, the start key bit KO6 of the game key register 3 shown in FIG. 15 is set to "0" in a step S18, the LCNTs 4 and 3 of the LCD control data shown in FIG. 14 are set to "11" in a step S19, and then, proceeding to the step S20. By the process in the step S18, the start key bit KO6 is set irrespective of an operation of the * key 24d (function as a start key), and the game proceeds to a pause state. Furthermore, the tone of the game screen is up by the processing in the step S19.

The subroutine shown in FIG. 27 is processed in the step S20. At this time, the binary image data indicative of the incoming call message "IN INCOMING CALL" and the phone number of the transmission source is drawn in the frame memory 86. Successively, the ring tone is generated from the speaker 48 in a step S21, and whether the hook key 24a is operated or not is determined in a step S22. Then, where the hook key 24a is operated, the output of the ring tone is stopped in a step S23, and the communication processing is executed in a step S24. Whether the hold key 24b is operated or not is determined in a step S25, and as long as the hold key 24b is not operated, the communication processing in the step S23 is repeated.

If the hold key 24b is operated, the process proceeds from the step S25 to a step S26, and a state of the game CPU start flag is determined. If the game start flag is in the reset state, the process proceeds to a step S28. However, if the game start flag is in the set state, the LCNT 4s and 3 of the LCD control data are set to "10" in a step S27, i.e. the tone of the game screen is restored, and then, the process proceeds to the step S28. In the step S28, the subroutine shown in FIG. 27 is processed, whereby the binary image data in which all dots indicate "0" is written to the frame memory 86. The incoming call message and the phone number of the transmission source displayed on the LCD 18 are deleted by the processing of the step S28. In completion of the processing in the step S28, the process proceeds to a step S33.

When "NO" is determined in any steps S3, S7, S11 and S16, the remaining amount of the battery and the receiving condition are detected in steps S29 and S30, and the today's date and the current time are detected in a step S31. Successively, a subroutine shown in FIG. 30 is processed in a step S32, and in completion of the process of the step S32, the process proceeds to the step S33.

Figure 30:
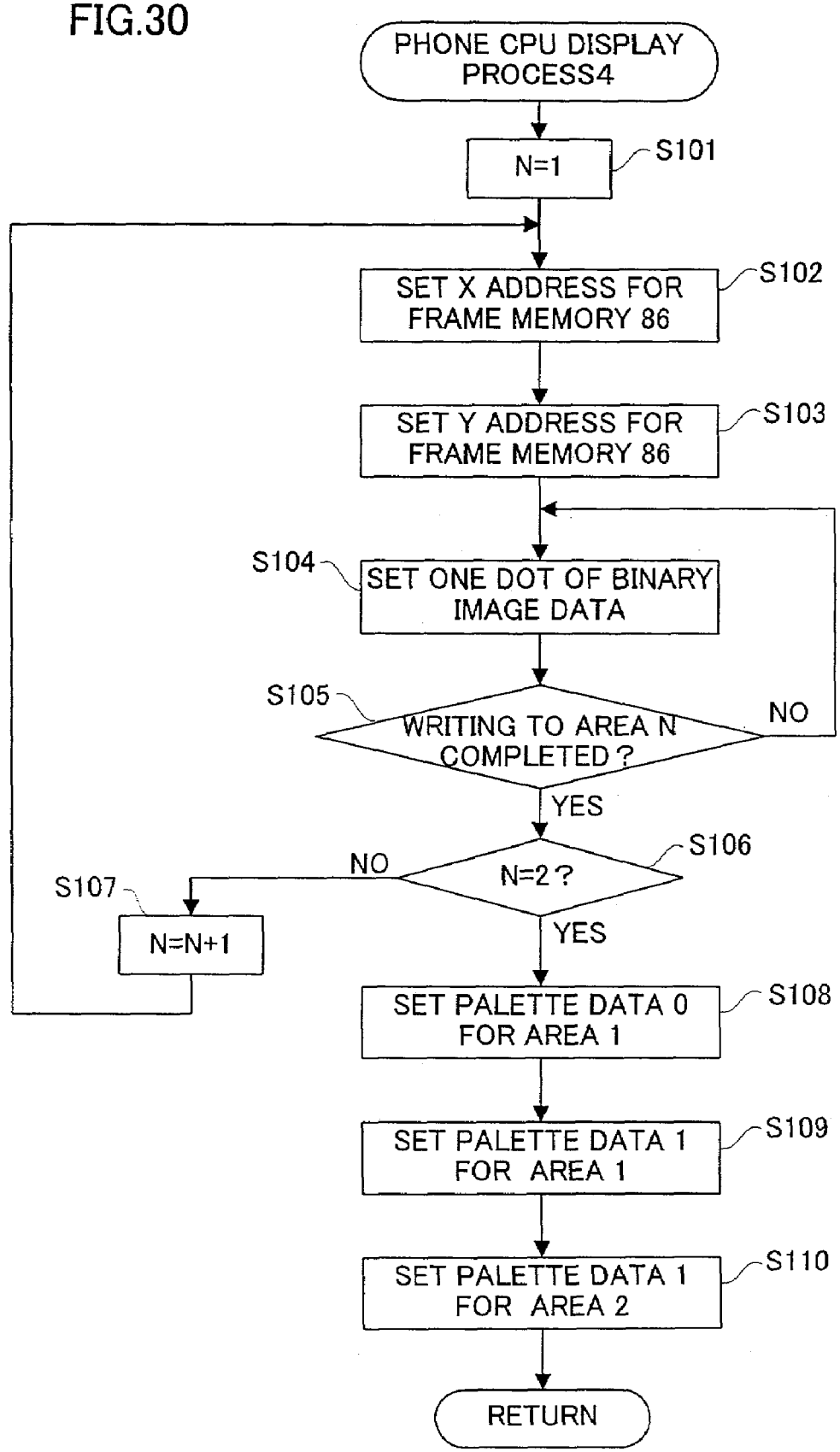
FIG. 30 is a flowchart showing the other part of the operation of the phone CPU core.

Referring to FIG. 30, first, the counted value N is set to "1" in a step S101, and then, the X address for the frame memory 86 and the Y address for the frame memory 86 are set in the frame memory register 80a in steps S102 and S103, respectively. Furthermore, the one dot of binary image data is set in the same frame memory register 80a in a step S104. The address data set in the steps S102 and S103 is the head address of the area N formed in the frame memory 86, and the binary image data set in the step S104 is data to be written into the head address. It is determined whether or not the writing of the binary image data to the area N is completed in a step S105, and if "NO" is determined, the process of the step S104 is repeated. If "YES" is determined in the step S105, it is determined whether the counted value N is "2" or not in a step S106, and if "NO" is determined, the counted value N is incremented in a step S107, and then, the process returns to the step S102.

As a result, the processing from the steps S102 to S105 is repeated twice, and the binary image data are written to the respective areas 1 and 2 formed in the frame memory 86. The area 1 is stored with the binary image data indicative of the characters of the receiving condition and the remaining amount of the battery, and the area 2 is stored with the binary image data indicative of the characters of today's date and the current time. The receiving condition, the remaining amount of the battery, the date and the time detected in the steps S29 to S31 are reflected on the respective characters.

If "YES" is determined in the step S106, the palette data 0 for the area 1, the palette data 1 for the area 1 and the palette data 1 for the area 2 are set to the palette control register 80c in steps S108, S109 and S110, respectively. The binary image data formed in the frame memory 86 is outputted to the LCD 18 through the coloring processing according to the palette data 0 for the area 1, the palette data 1 for the area 1 and the palette data 1 for the area 2. The area 1 of the LCD 18 is displayed with the receiving condition and the remaining amount of the battery at this moment, and the area 2 is displayed with the characters indicative of the today's date and the current time.

Figure 24:
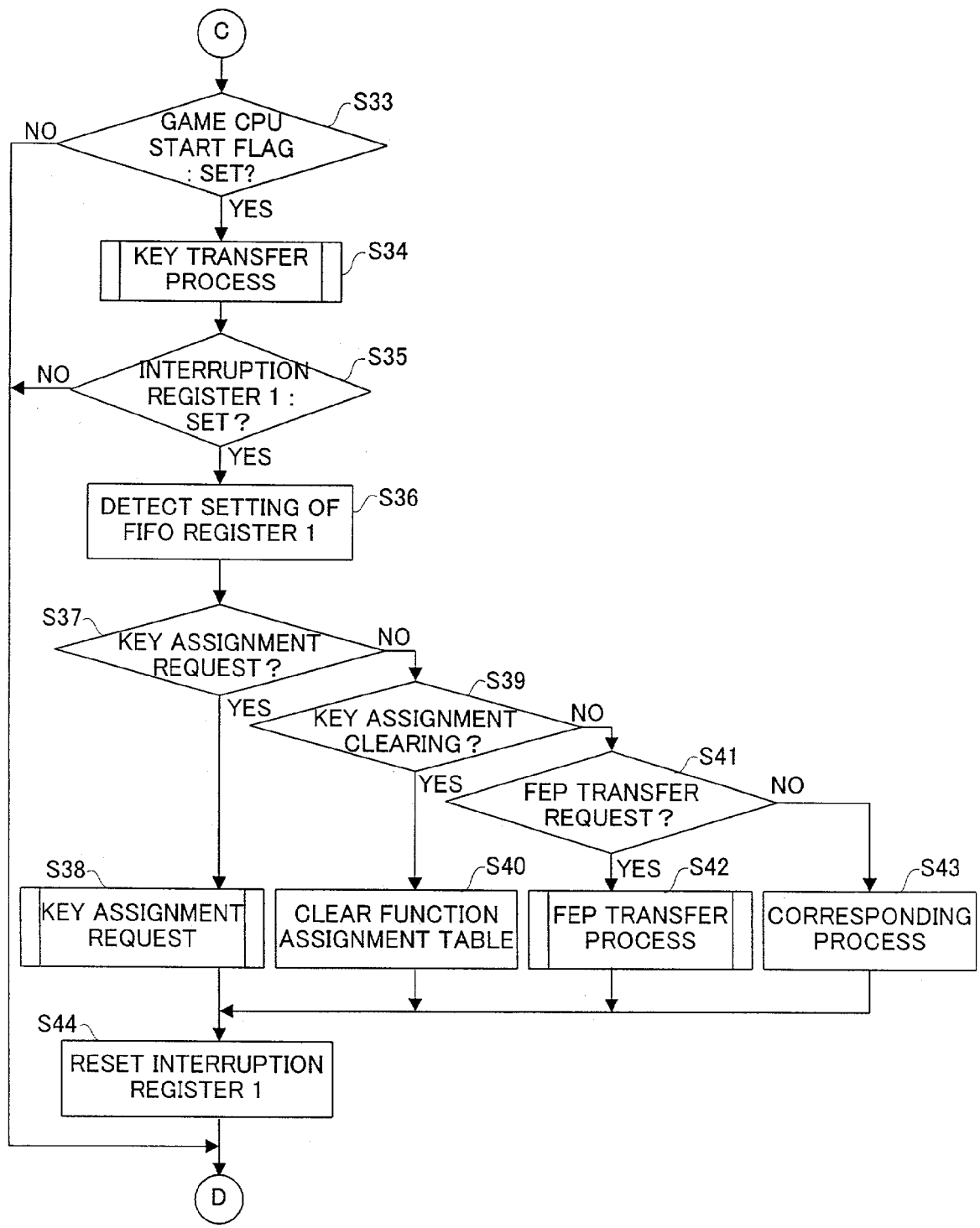
FIG. 24 is a flowchart showing the other part of the operation of the phone CPU core.

Referring to FIG. 24, a state of the game CPU start flag is determined in the step S33, and if the flag is in the reset state, the process returns to the step S3. On the other hand, if the game CPU start flag is in the set state, key transfer processing (described after) is executed in a step S34, and it is determined whether or not the interruption request is set to the interruption register 1 in a step S35. If the interruption request is not set, the process directly returns to the step S3. Accordingly, when the phone mode is set, the processing from the steps S3 to S32 are repeated, and when the phone mode is set but the interruption request is not given, the processing from the steps S3 to S32 and the step S34 are repeated.

If the interruption request is set into the interruption register 1, the setting of the FIFO register 1 is detected in a step S36, and the contents of the detected setting are identified in steps S37, S39, and S41.

Figure 31:
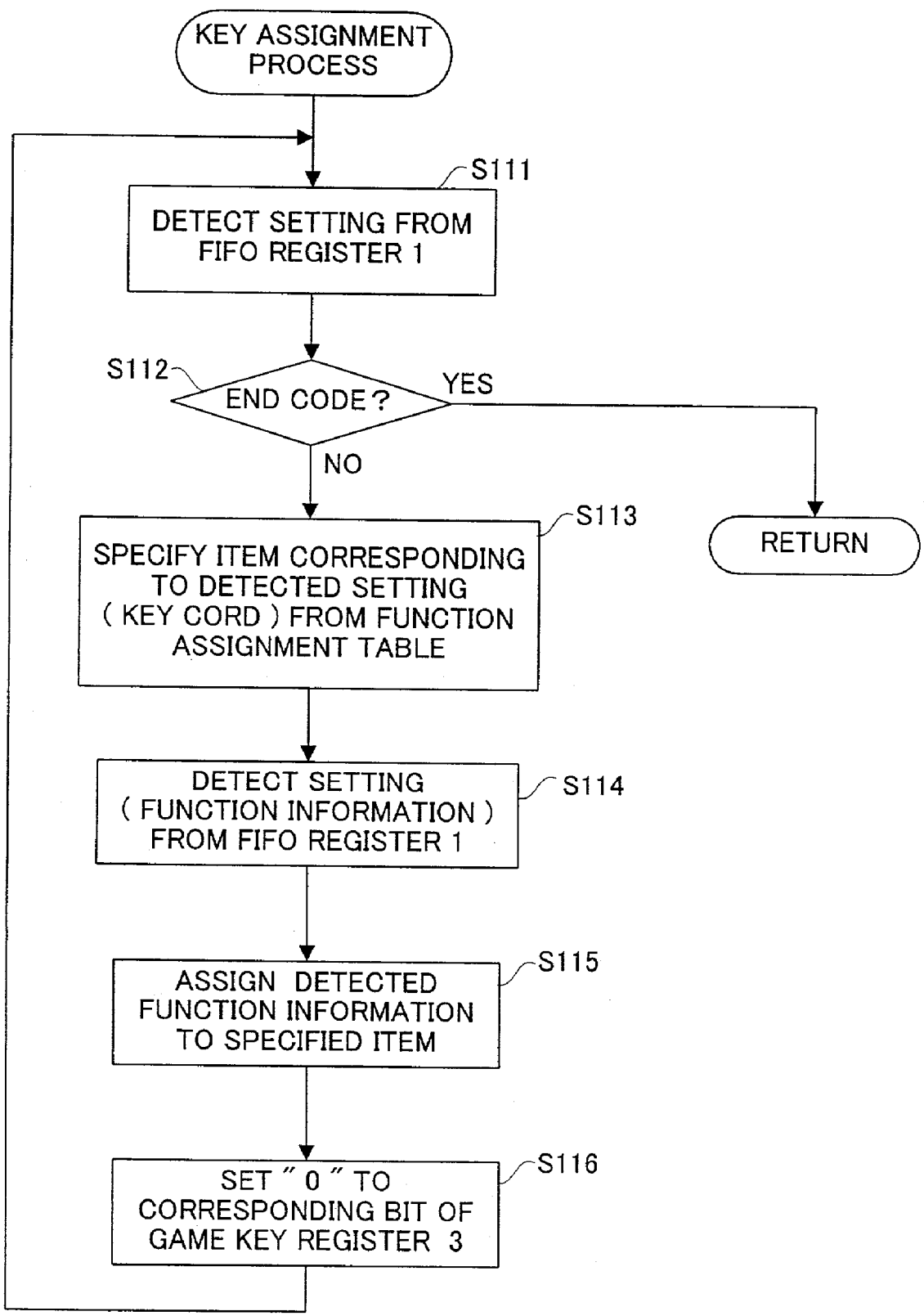
FIG. 31 is a flowchart showing further part of the operation of the phone CPU core.

If the content of the detected setting is a key assignment request, key assignment processing is executed in a step S38. Specifically, a subroutine shown in FIG. 31 is executed. First, the setting is detected from the FIFO register 1 in a step S111, and it is determined whether the detected setting is an end code or not in a step S112. Referring to FIG. 32, in a case the key assignment request is set in the FIFO register 1, a key code indicative any one of the phone key 24 is set following the key assignment request, and the function information indicative a function desired to be assigned to the key code is set following the key code. An end code is set after repeating of such the key code and the function information.

Accordingly, the key code is detected in the step S111, and "NO" is determined in the first step S112. In a step S113, a key item corresponding to the setting detected i.e., the key code is specified from a function assignment table 34a shown in FIG. 33 (formed in the SRAM34). For example, the "# key" is specified where the lower four digits of the key code is "1010", and the "* key" is specified where the lower four digits of the key code is "1011". The setting of the FIFO register 1 is detected again in a step S114. As described above, the setting following the key code is the function information, and the function information is detected in the step S114. In a step S115, the function information detected is assigned to the key item specified in the step S113. In completion of the processing of the step S115, "0" is set to the corresponding bit of the game key register 3, and thereafter, the process returns to the S111. When the setting detected in the step S111 indicates the end code, "YES" is determined in the step 112, restoring to the hierarchical upper level of the routine.

For example, if the function information indicative of "select" (lower 8 bits are 10000000) is detected following the key code indicative of the "# key", the selection function is assigned to the item of "# key" in the function assignment table 34a, and "0" is set in the KO7 of the game key register 3 shown in FIG. 15. Meanwhile, if the function information indicative of "start" (lower 8 bits are 01000000) is detected following the key code indicative of "* key", the start function is assigned to the item of "* key" in the function assignment table 34a, and "0" is set to the KO6 of the game key register 3.

Figure 34:
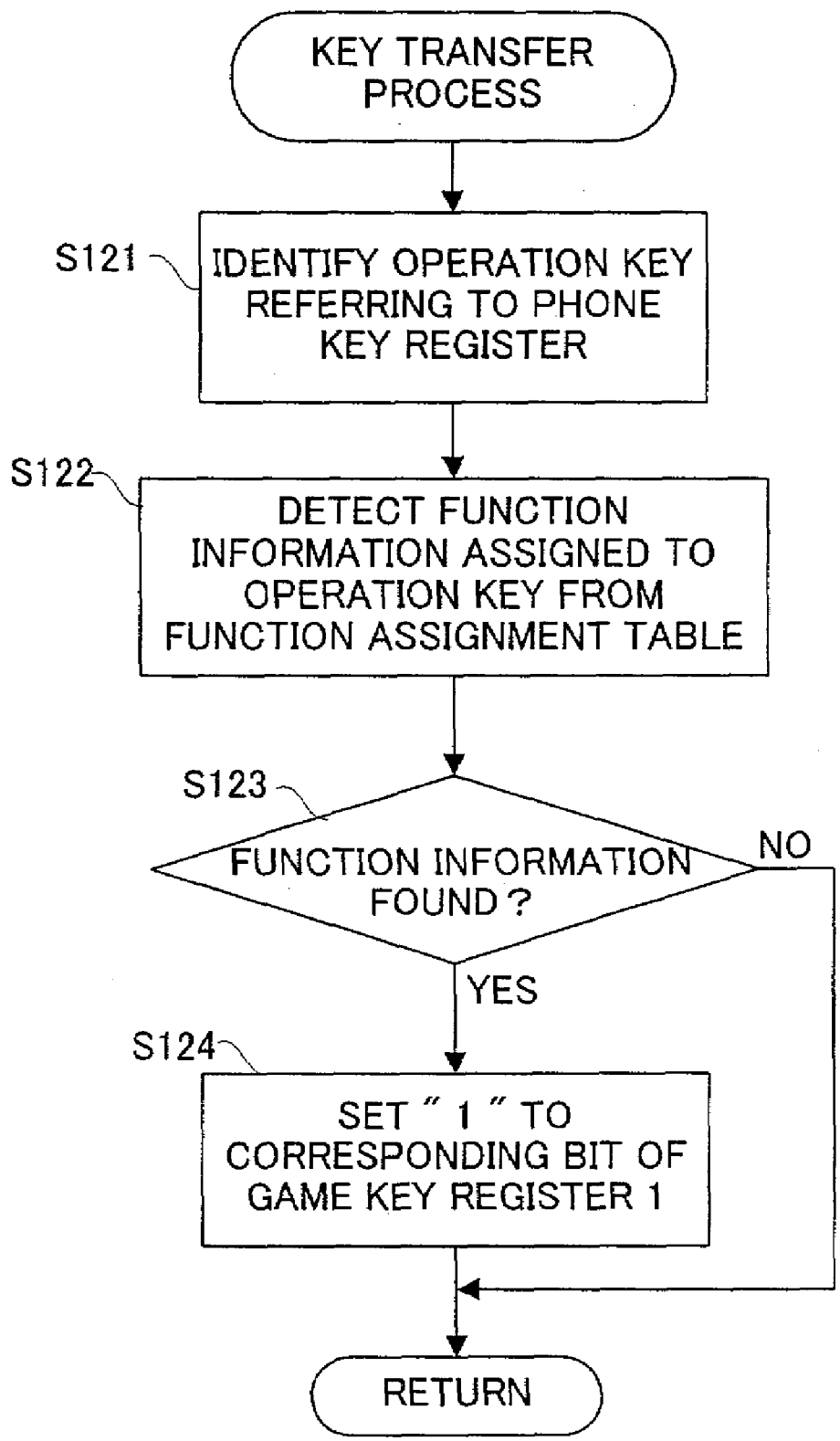
FIG. 34 is a flowchart showing another part of the operation of the phone CPU core.

A subroutine shown in FIG. 34 is executed with reference to the function assignment table 34 thus formed in the step S34 shown in FIG. 24. First, in a step S121, it is determined which phone key 24 is operated referring to the phone key register 28b shown in FIG. 9. The function information assigned to the identified operation key is searched from the function assignment table 34a in a step S122, and it is determined whether or not the function information is found from the function assignment table 34a in a step S123.

According to the FIG. 33, the key item indicative of the number keys 24c is provided to the function assignment table 34a besides "# key" and "* key", and some key items may be not assigned the function information. This is the reason why it is determined whether the function information is found or not in the step S123. Where the function information is not found, the process directly restores to the hierarchical upper level of the routine, and where the function information is found, the corresponding bit of the game key register 3 is set to "1" in a step S124, restoring to the hierarchical upper level of the routine.

For example, when the operator presses the number keys 24c indicative of "1", no bits of the game key register 3 is set to "1". On the other hand, when the operator presses the * key 24d, the KO6 of the game key register 3 is set to "1".

Returning to FIG. 24, when the contents of the detected setting are a key assignment clearing, "YES" is determined in a step S39, and the function assignment table 34a is cleared in a step S40. When the contents of the detected setting are a FEP (Front End Processing) transfer request, "YES" is determined in a step S41, and FEP transfer processing is executed in a step S42.

Figure 35:
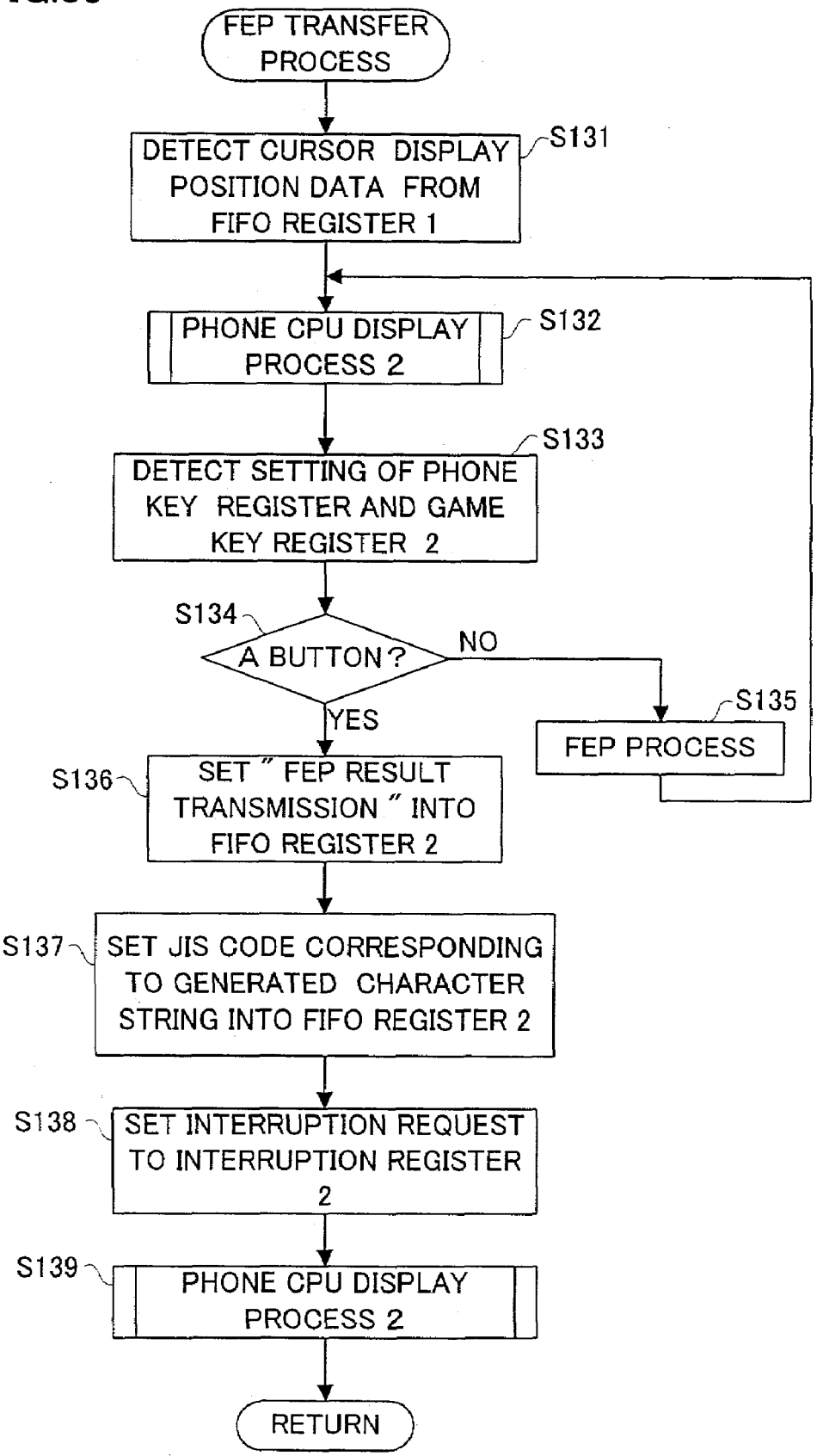
FIG. 35 is a flowchart showing the other part of the operation of the phone CPU core.

The FEP transfer processing is executed following a subroutine shown in FIG. 35. First, the cursor display position data is detected from the FIFO register 1 in a step S131, and then, the subroutine shown in FIG. 27 is processed in a step S132. The binary image data drawn in the area 2 of the frame memory 86 at this time is image data indicative of the cursor. A drawing position of the cursor is determined based on the cursor display position data, and the binary image data is stored in the frame memory 86 in a manner shown in FIG. 36(A).

On the other hand, color image data indicative of the guide message "INPUT YOUR NAME" and the name input frame are drawn in the frame memory 88 by the game CPU 40. As a result, the player name input screen shown in FIG. 36(C) is displayed on the LCD 18.

In completion of the process in the step S132, the settings of the phone key register 28b and the game key register 2 are detected in a step S133, and it is determined whether the A button 22b is operated or not in a following step S134. If "NO" is determined herein, it is assumed that the phone key 24 is operated, and then, the process proceeds to a step S135 so as to execute the FEP processing. In completion of the FEP processing, the process returns to the step S132. A character string in correspondence to the operation of the phone key 24 is generated by the FEP processing, and the generated character string is displayed on the LCD 18 by processing of the following step S132.

For example, when inputting "YAMADATARO" by operating the phone key 24, the binary image data is drawn on the frame memory 86 in a manner shown in FIG. 37 (A), and the characters of "YAMADATARO" are displayed at the name input frame on the LCD 18 as shown in FIG. 37(C). The cursor is displayed at the right of "RO".

If the operator operates the A button 22b after the completion of the name input, KI0 bit of the game key register 2 shown in FIG. 15 is renewed to "1". At this time, "YES" is determined in the step S134, and "FEP result transmission" and a JIS code in correspondence to the character string generated are set into the FIFO register 2. Furthermore, the interruption request is set to the interruption register 2 in a step S138. A subroutine shown in FIG. 27 is processed in a step S139, and thereafter, the process is restored to the hierarchical upper level of the routine.

The binary image data in which all bits indicate "0" is drawn in the area 2 of the frame memory 86 in the step S139, whereby only the binary image data of characters indicative of the receiving condition and the remaining amount of the battery remains in the frame memory 86. However, color image data indicative of "YAMADA TAROU" is drawn in the frame memory 88 in a manner shown in FIG. 38(B) by a process of the game CPU 40 described later, and the player name input screen shown in FIG. 38(C) is displayed on the LCD18.

Returning to FIG. 24, in completion of the processing in the step S38, S40, or S42, the interruption register 1 is reset in a step S44. Meanwhile, if "NO" is determined in the steps S37, S39, and S41, the corresponding process is executed in a step S43, and the interruption register 1 is reset in the step S44. In completion of the processing in the step S44, the process returns to the step S3.

The game CPU core 50 processes flowcharts shown in FIGS. 39 to 43. First, a state of the game CPU flag is determined in a step S201. When it is determined to be in the set state, key assignment request processing is executed in a step S202, and game CPU display processing is executed in a step S203.

Figure 41:
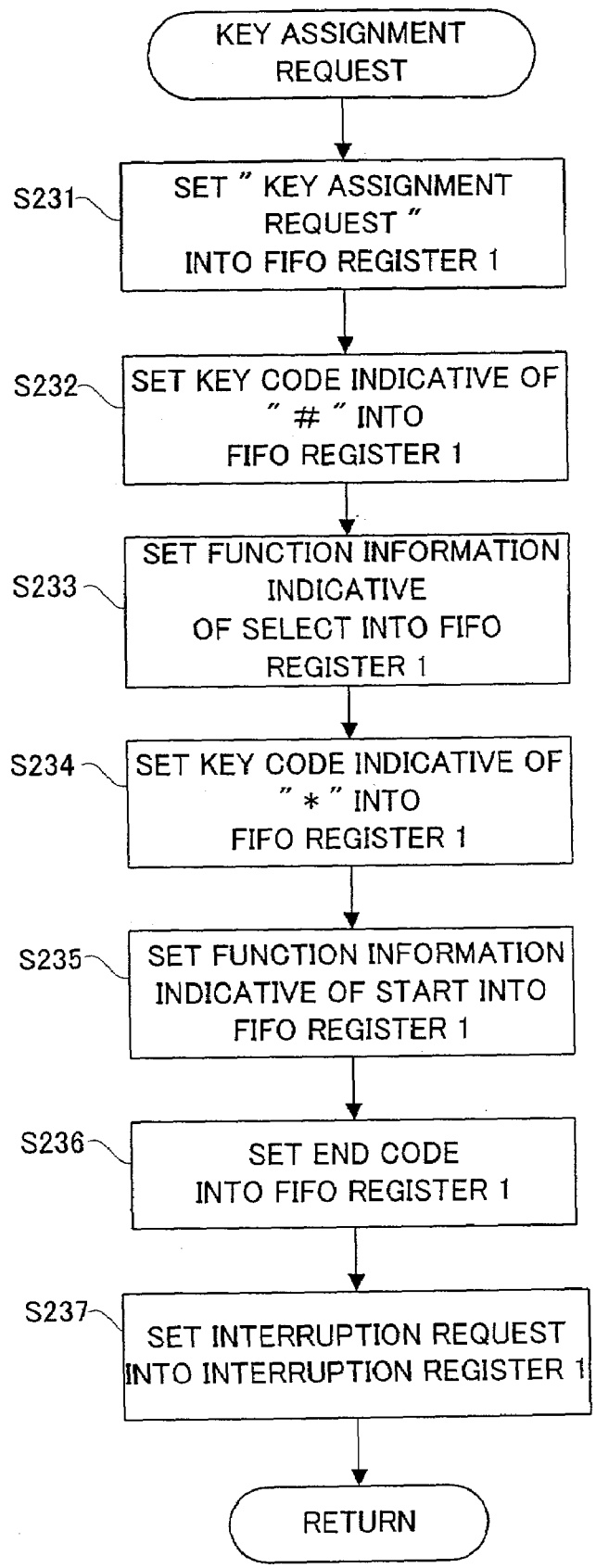
FIG. 41 is a flowchart showing the other part of the operation of the game CPU core.

The key assignment request processing is executed according to a subroutine shown in FIG. 41. Referring to FIG. 41, the key assignment request, the key code indicative of "# key", the function information indicative of "select", the key code indicative of "* key", the function information indicative of "start" and the end code are set to the FIFO register 1 in steps S231 to S236. Successively, in step S237, the interruption request is set to the interruption register 1 shown in FIG. 13, and after the completion of the process in the step S237, the process is restored to the hierarchical upper level of the routine. As a result, the key assignment processing (step S38 in FIG. 24) is executed by the phone CPU core 28a, and therefore, the selection function is assigned to the # key 24e and the start function is assigned to the * key 24d.

Figure 42:
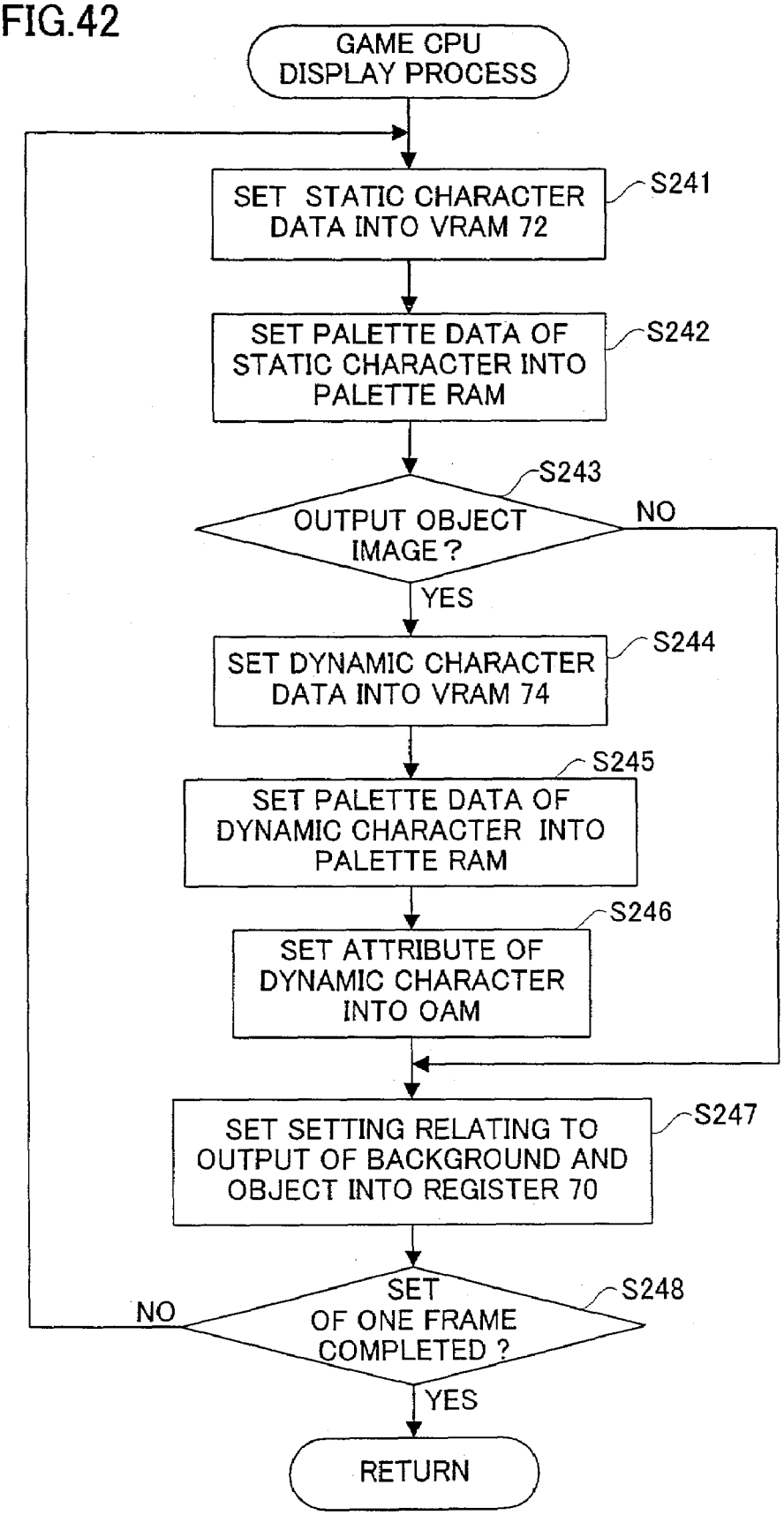
FIG. 42 is a flowchart showing further part of the operation of the game CPU core.

The game CPU display processing is executed according to a subroutine shown in FIG. 42. Referring to FIG. 42, first, the static character data forming the background image data is set to the VRAM 72 in a step S 241, and the palette data of the static character is set to the color palette RAM 68 in a step S242. Successively, it is determined whether or not the screen to be displayed at this time is a screen to output the object image data in a step S243, and if "NO" is determined, the process directly proceeds to a step S247. However, if "YES" is determined, the process proceeds to the step S247 through the processing of steps S244 to S246. For example, since the object image (dynamic character) is needed to display with respect to the game screen shown in FIG. 4, the process proceeds to the step S244 at this time. On the other hand, it is appropriate that only the background image is displayed with respect to the player name input screens in FIGS. 6(A) and 6(B) and therefore, the process proceeds to the step S247.

In the case of displaying the object image, first, the dynamic character data is set to the VRAM 74 in the step S244, and the palette data of the dynamic character is set to the color palette RAM 68 in step S245. Furthermore, the attribute of the dynamic character is set to the OAM 76 in the step S246, and in completion of processing of the step S246, the process proceeds to the step S247.

The settings relating to the output of the background image and the object image are set to the register 70 in the step S247, and it is determined whether the processing for one frame is finished or not in a following step S248. Herein, if "NO" is determined, the process returns to the step S241 so as to repeat the above-described processing. If "YES" is determined, the process is restored to the hierarchical upper level of the routine.

The PPU 78 performs the coloring on the static character data according to the palette data of the color palette RAM 68 in accordance with the settings of the register 70 and performs the coloring on the dynamic character data according to the palette data of the color palette RAM 68 as necessary. The color image data colored is written to the frame memory 88 by the LCD controller 84 and then is outputted to LCD 18 by the same LCD controller 84. As a result, the color image is displayed on the LCD 18.

Figure 39:
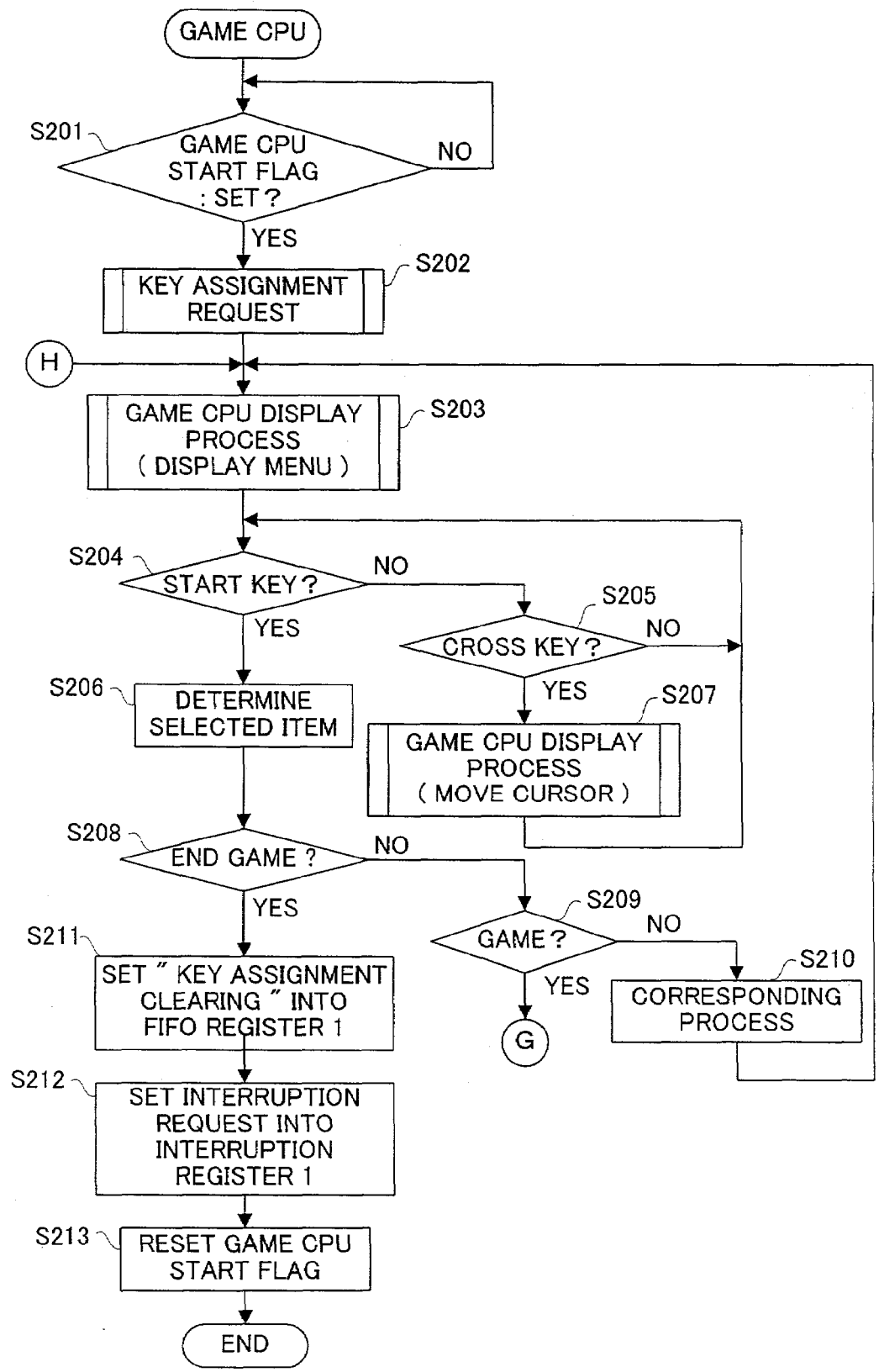
FIG. 39 is a flowchart showing a part of an operation of a game CPU core.

The menu screen shown in FIG. 3 is displayed on the LCD 18 in the game CPU display processing of the step S203 shown in FIG. 39. The menu screen is formed by the static character (text) and the object (cursor).

It is determined whether or not the start key (* key 24d) is operated in a step S204, and it is determined whether or not the select key (# key 24e) is operated in a step S205. Both the determinations are executed referring to the game key register 1. When the select key 24e is operated, the subroutine shown in FIG. 42 is processed in a step S207, and then, the process returns to the step S204. The cursor on the menu screen is moved by the process of the step S207. When the start key is operated, the selected item is fixed in a step S206. For example, when the start key is pressed in a state the cursor points to "SUPER MARIO DX" shown in FIG. 3, "game" is fixed as the selected item. When the start key is pressed in a state the cursor points to "GAME OVER", "GAME OVER" is fixed as the selected item.

It is determined whether or not the selected item is "GAME OVER" in a step S208, and it is determined whether or not the selected item is "GAME" in a step S209. If the selected item is "GAME OVER", the processes after a step S211 are executed, and if the selected item is "GAME", the processes after steps S214 are executed. If the selected item is neither "GAME" nor "GAME OVER", the corresponding process is executed in a step S210, and then, the process returns to the step S203.

The key assignment clearing is set to the FIFO register 1 in the step S211, and the interruption request is set to the interruption register 1 in a following step S212. Accordingly, the function assignment table 34a is cleared by the phone CPU core 28a (step S40 in FIG. 24). In completion of the processing of the step S212, the game CPU start flag is reset in a step S213 so as to complete the processing.

Figure 40:
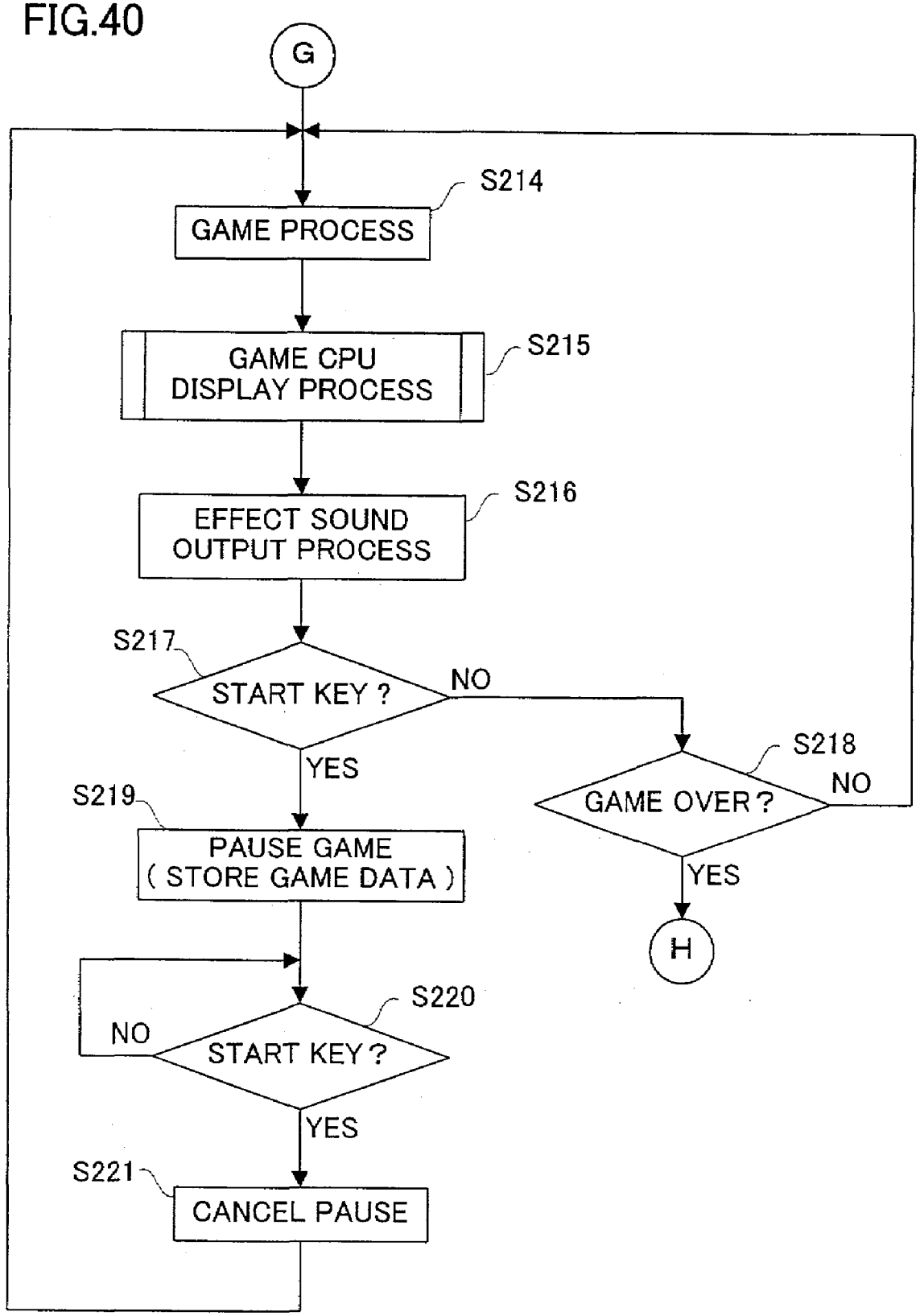
FIG. 40 is a flowchart showing another part of the operation of the game CPU core.

Referring to FIG. 40, game processing, game CPU display processing, and effective sound output processing are executed in steps S214, S215 and S216. In the game processing, the settings of the color palette RAM 68, the register 70, the VRAMs 72 and 74, and the OAM 76 are renewed as necessary. In the game CPU display processing, the game image formed by the screen, the static object and the dynamic character shown in FIG. 4 is displayed on the LCD 18. In the effective sound output processing, the effective sound data is outputted from the SPU 64. In a step S217, it is determined whether or not the start key is operated referring to the game key register 1, and it is determined whether or not the game is over in a step S218.

When the game is over, "YES" is determined in the step S218, and the process returns to the step S203. Thus, the menu screen shown in FIG. 3 is displayed on the LCD 18.

When K6 bit of the game key register 1 is renewed to "1" by an operation of the start key, "YES" is determined in the step S217, and the game is paused in a step S219. More specifically, the K6 bit is restored to "0" and current game data is stored in the flash memory 54. The value of the K6 bit of the game key register 1 is identified again in a step S220, and as far as the value of the K6 bit indicates "0", the process of the step S220 is repeated. Thus, the pause state is continued. When the K6 bit of the game key register 1 are renewed to "1" by an operation of the start key, "YES" is determined in the step S220, and the pause state is canceled in a step S221. More specifically, the K6 bit of the game key register 1 is restored from "1" to "0". In completion of the process of the step S221, the process returns to the step S214. As a result, the movement of the game screen and the BGM are resumed.

It is noted that even if it is impossible to return from the pause state due to any reason (e.g. consumption of a battery) after finishing a phone, it is possible to resume the game where it is interrupted by another operation (e.g. restart) by storing the game data in the step S219.

Figure 43:
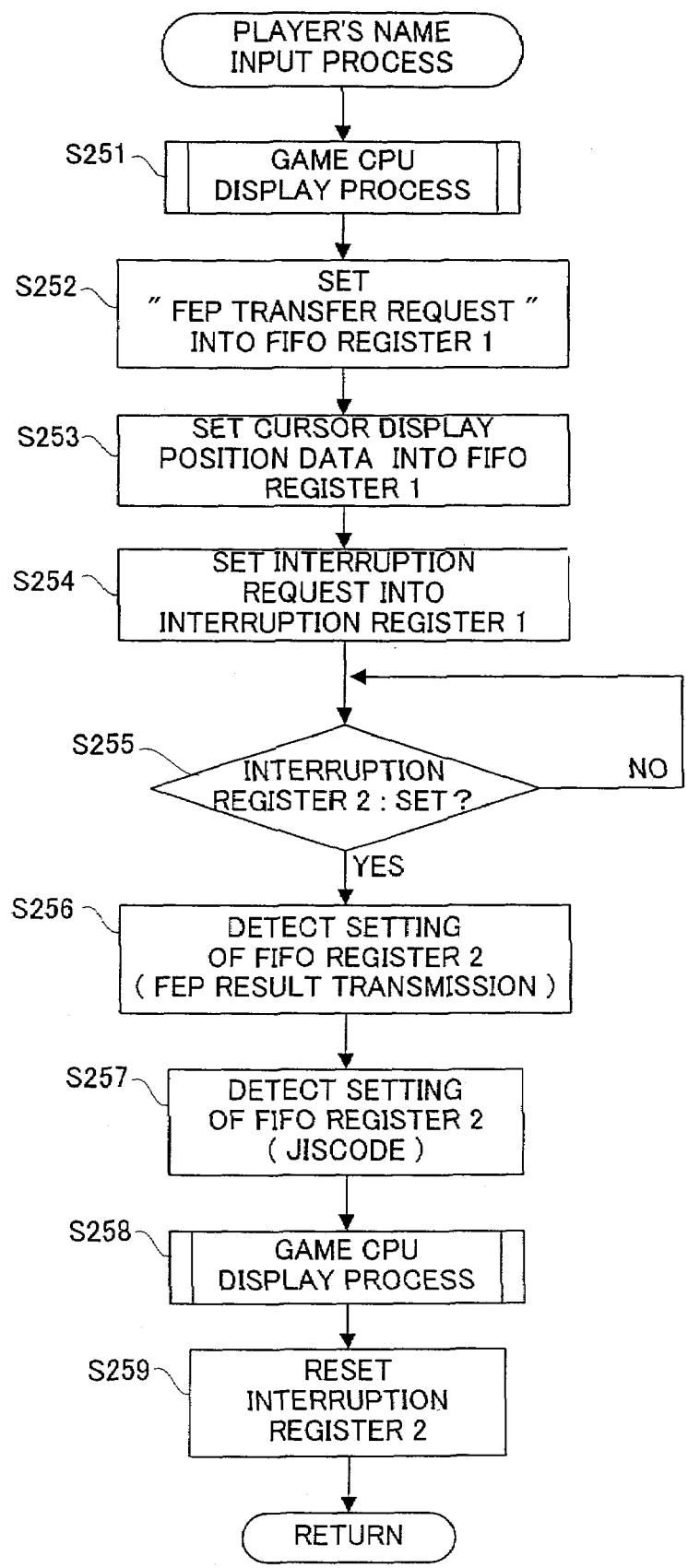
FIG. 43 is a flowchart showing another part of the operation of the game CPU core.

In a case there appears a stage to input the player's name during the game processing in the step S214, the game CPU core 50 processes a subroutine shown in FIG. 43. First, the game CPU display process shown in FIG. 42 is executed in a step S251. Thus, the color image date of the message "INPUT YOUR NAME" and the name input frame as shown in FIG. 36(B) are written to the frame memory 88, and the name input screen shown in FIG. 36(C) is displayed on the LCD 18. However, the cursor is not displayed upon at a time the step S251 is completed.

Successively, the FEP transfer request is set to the FIFO register 1 in a step S252, the cursor display position data is set to the FIFO register 1 in a step S253, and the interruption request is set to the interruption register 1 in a step S254. Accordingly, the FEP transfer processing (step S42 in FIG. 24) is executed by the phone CPU core 28a, and the cursor is displayed within the name input frame as shown in FIG. 36(C).

It is determined whether or not the interruption request is set to the interruption register 2 in a step S255. If "YES" is determined herein, the setting of the FIFO register 2 (FEP result transmission) is detected in a step S256, and the setting of the FIFO register 2 (JIS code) is detected in a step S257. Furthermore, the game CPU display processing is executed in a step S258 so as to display the name within the name display frame on the basis of the detected JIS code. Hence, the color image date of the message, the name display frame and the name as shown in FIG. 38(B) are drawn in the frame memory 88, and the name input screen shown in FIG. 38(C) is displayed on the LCD 18. A drawing position of the color image data indicative of the name is determined on the basis of the cursor display position data described above. In completion of the process of the step S258, the interruption register 2 is reset in a step S259, and then the process is restored to the hierarchical upper level of the routine.

As is understood from the above description, the phone CPU core 28a processes the phone function being continuously set into an on state, and the game CPU core 50 processes the game function set into an on state in case of necessity. The binary image data and the color image data relating to the phone function are generated by the phone CPU core 28a, and written to the frame memories 86 and 88 through the register 80 and the LCD controller 84. Furthermore, the color image data relating to the game function is generated by the game CPU core 50 and the PPU 78, and written to the frame memory 88 through the LCD controller 84.

Herein, the game CPU core 50 writes the color image data to the frame memory 88 through the PPU 78 and the LCD controller 84 when the game start flag is set in response to the operation of the game star key 20. On the other hand, the phone CPU core 28a writes the color image data to the frame memory 88 through the register 80 and the LCD controller 84 when the game is completed by the operation of the hold key 24b.

When the game start key 20 is not pressed, the binary image data indicative of the character of the receiving condition, the remaining amount of the battery, and etc. is stored in the frame memory 86, and the color image data indicative of a predetermined game character is stored in the frame memory 88. On the other hand, the data in the frame memory 88 is updated by the color image data indicative of the game image when the game is started by operating the game start key 20.

The LCD controller 84 displays the composite image based on such binary image data and the color image data.

Therefore, the incoming call stand-by screen formed by the characters such as the receiving state and the remaining amount of the battery and the game character is displayed on the LCD 18 in the incoming call stand-by state. After the game is started, the game screen formed by the characters such as the receiving state, the remaining amount of the battery and the game image is displayed on the LCD 18.

In this manner, the frame memory 88 is accessed by the phone CPU 28a while the game is not started and accessed by the game CPU core 50 when the game is started, and therefore, it is possible to utilize the frame memory 88 with efficiency.

Figure 44:
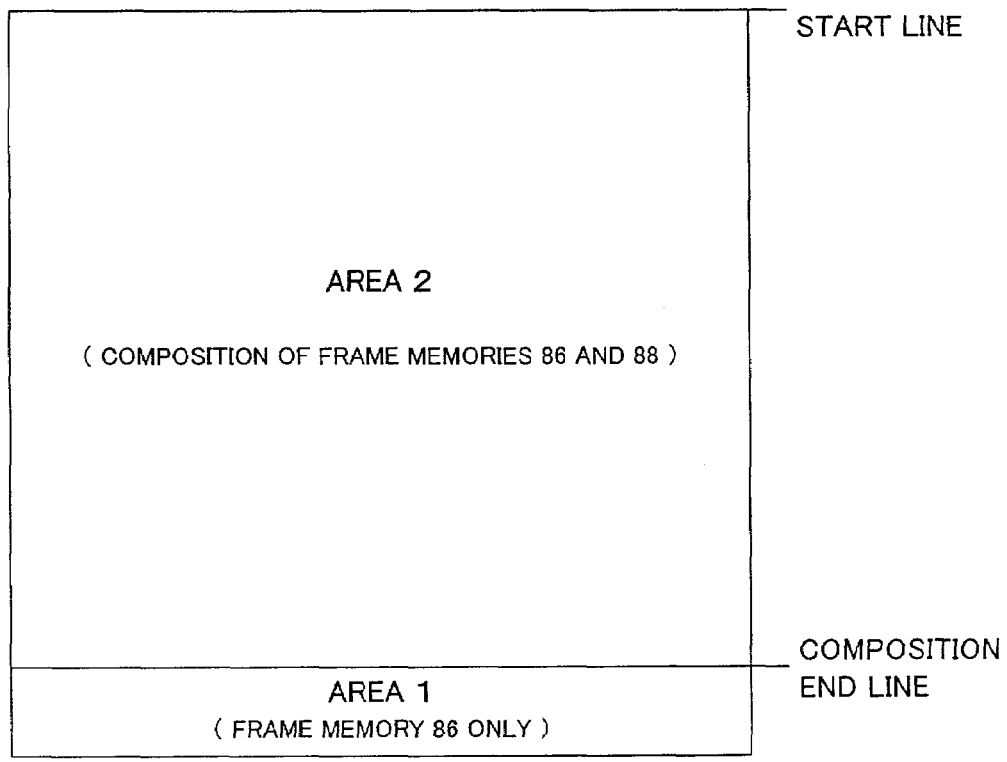
FIG. 44 is an illustrative view showing one part of an operation relating to another embodiment of the present invention.
Figure 45:
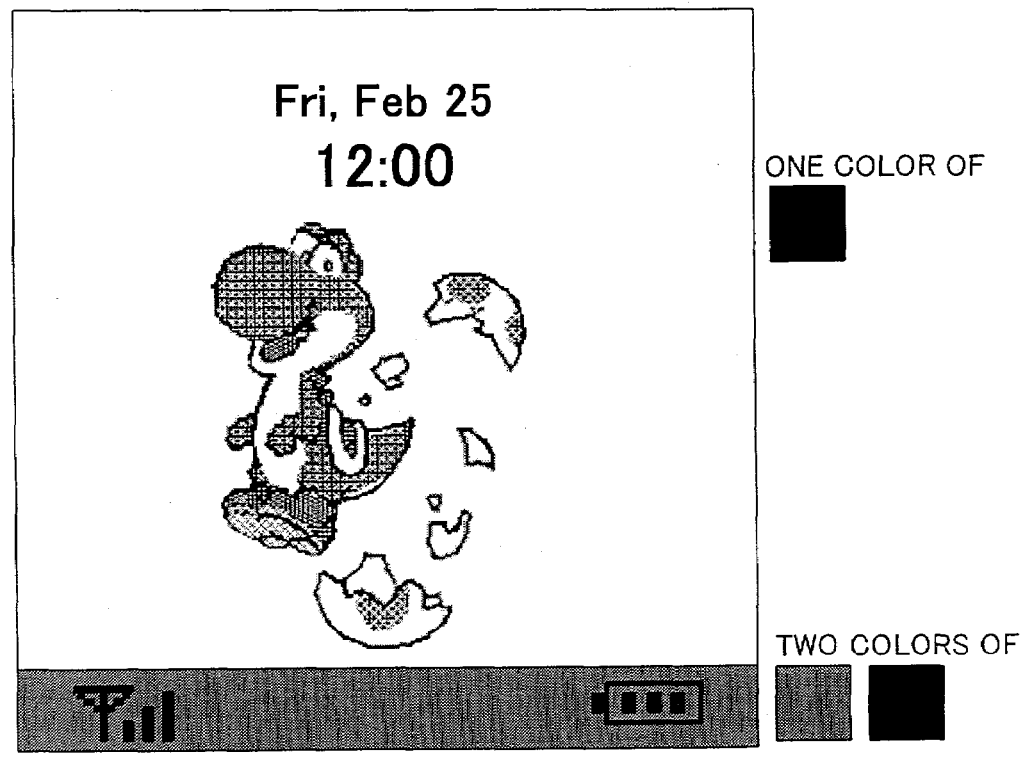
FIG. 45 is an illustrative view showing another part of the operation relating to another embodiment of the present invention.

It is noted that the areas 1 and 2 are formed as shown in FIG. 16, and the characters indicative of the receiving condition and the remaining amount of the battery are displayed on the area 1 as shown in FIG. 17 in this embodiment. However, the areas 1 and 2 may be formed as shown in FIG. 44, and the characters indicative of the receiving condition and the remaining amount of the battery may be displayed on the area 1 as shown in FIG. 45.

Furthermore, in this embodiment, although the tone of the game screen is up when there is an incoming call during the game, the tone of the game screen may be down.

In addition, in this embodiment, although key function and select key function of the game are assigned to the phone key (# and *), another function of the game may be assigned to the phone key.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image display apparatus comprising:
   a first function processing system for processing a first function which is continuously set into an on state;
   a second function processing system for processing a second function which is selectively set into an on state;
   first writing means for writing image data relating to the first function to a first memory;
   second writing means for writing image data relating to the first function to a second memory;
   third writing means for writing image data relating to the second function to the second memory;
   display circuitry for displaying a composite image on a display on the basis of the image data stored in the first memory and the image data stored in the second memory; and
   enabling means for selectively enabling the second writing means or the third writing means depending on whether the second function is turned on or off.

2. An image display apparatus according to claim 1, wherein the image data written to the first memory comprises image data in which each dot has a first number of bits, and the image data written to the second memory comprises image data in which each dot has a second number of bits more than the first number of bits.

3. An image display apparatus according to claim 1, wherein the first function is a phone function, the second function is a game function, the image data written to the first memory includes at least character data indicative of a receiving state, the image data written to the second memory by the second writing means includes predetermined image data, and the image data written to the second memory by the third writing means includes game image data.

4. An image display apparatus according to claim 3, wherein the first function processing system includes a detector for detecting an incoming call, the first writing means includes incoming call message writing means for writing image data indicative of an incoming call message to the first memory when the incoming call is detected, and the display circuitry includes tone modifying means for modifying a tone of the image data in the second memory when the incoming call is detected.

5. An image display apparatus according to claim 1, wherein the display circuitry includes fetching means for fetching compositing position information indicative of a compositing position of the image data written to the second memory and compositing means for generating composite image data on the basis of the compositing position information, the image data written to the first memory and the image data written to the second memory.

6. An image display apparatus according to claim 5, wherein the image data written to the first memory is binary image data in which each dot is formed by one bit, the image data written to the second memory is color image data in which each dot is formed by a plurality of bits, and the compositing means includes first single color fetching means for fetching first single color data in correspondence to a first predetermined bit value of the binary image data, second single color fetching means for fetching second single color data in correspondence to a second predetermined bit value of the binary image data, first selecting means for selecting any one of the first single color data and the color image data according to the compositing position information, identifying means for identifying a bit value of the binary image data every one dot, and second selecting means for selecting any one of an output of the first selecting means and the second single color data in accordance with an identification result of the identifying means.

7. An image display apparatus according to claim 1, wherein the display circuitry includes readout start position information fetching means for fetching readout start position information of the image data in the second memory, and readout means for reading out the image data from the second memory according to the readout start position information.

8. An image display apparatus according to claim 1, wherein the display circuitry displays an image based on the image data in the first memory by priority.

9. A display control method executed by an image display apparatus provided with a first function which is continuously set into an on state and a second function which is selectively set into an on state, the method comprising:
 (a) writing image data relating to the first function to a first memory;
 (b) writing image data relating to the first function to a second memory when the second function is in an off state;
 (c) writing image data relating to the second function to the second memory when the second function is in an on state; and
 (d) displaying a composite image on a display on the basis of the image data stored in the first memory and the image data stored in the second memory.

10. An image display apparatus comprising one or more processing systems for executing the method of claim 9.

11. A display control program executed by an image display apparatus provided with a first function which is continuously set into an on state and a second function which is selectively set into an on state, the program comprising:
 (a) writing image data relating to the first function to a first memory;
 (b) writing image data relating to the first function to a second memory when the second function is in an off state;
 (c) writing image data relating to the second function to the second memory when the second function is in an on state; and
 (d) displaying a composite image on a display on the basis of the image data stored in the first memory and the image data stored in the second memory.

12. A storage medium storing a display control program executed by an image display apparatus provided with a first function which is continuously set into an on state and a second function which is selectively set into an on state, the display control program comprising:
 (a) writing image data relating to the first function to a first memory;
 (b) writing image data relating to the first function to a second memory when the second function is in an off state;
 (c) writing image data relating to the second function to the second memory when the second function is in an on state; and
 (d) displaying a composite image on a display on the basis of the image data stored in the first memory and the image data stored in the second memory.

13. An image display apparatus comprising the storage medium of claim 12.

14. An image display apparatus comprising:
 a first processor for executing a communication-related function;
 a second processor for executing a game-related function;
 a first memory for storing communication-function-related image data;
 a second memory for storing either communication-function-related image data or game-function-related image data; and
 a display controller for generating a display that comprises a non-composite display portion based on contents of one or the other of the first and second memories and a composite display portion based on a composite of contents of both the first and second memories.

15. The image display apparatus according to claim 14, wherein the second memory stores communication-function-related image data or game-function-related image data based on whether the game-related function is being executed by the second processor.

16. The image display apparatus according to claim 14, further comprising:
 an interrupt signal path between the first processor and the second processor.

17. The image display apparatus according to claim 14, further comprising:
 a common bus to which the first processor and the second processor are coupled.

18. The image display apparatus according to claim 14, further comprising:
 one or more registers,
 wherein locations and sizes of the non-composite and composite display portions are configurable via settings of the one or more registers.

19. The image display apparatus according to claim 14, wherein the communication-related function comprises a wireless communication-related function.

20. The image display apparatus according to claim 14, wherein the first and second mamories comprise respective frame memories.

21. The image display apparatus according to claim 14, wherein the image data stored in the first memory comprises one-bit image data and the image data stored in the second memory comprises multi-bit image data.

22. The image display apparatus according to claim 14, wherein, in response to a detecting of an incoming communication by the communication-related function, an instruction for pausing the game-related function is sent from the first processor to the second processor.

23. The image display apparatus according to claim 14, wherein the display controller controls the tone of the contents of the second memory based on whether or not the game-related function is being executed.

24. The image display apparatus according to claim 14, embodied as a portable communication terminal.

25. The image display apparatus according to claim 14, wherein the first processor continuously executes the communication-related function and the second processor selectively executes the game-related function.

26. A hand-held image display apparatus comprising:
a first processor for executing a wireless communication-related function and a second processor for executing a game-related function;
first and second memories each for storing image data; and
a display controller for generating a display comprising a non-composite display portion based on contents of one or the other of the first and second memories and a composite display portion based on a composite of contents of both the first and second memories.

27. The hand-held image display apparatus according to claim 26, wherein the image data stored in the first memory comprises one-bit image data and the image data stored in the second memory comprises multi-bit image data.

28. The hand-held image display apparatus according to claim 26, embodied as a portable communication terminal.

29. An image display method comprising:
storing in a first memory image data relating to a first function of an image display apparatus executed by a first processor;
storing in a second memory image data relating to a second function of the image display apparatus executed by a second processor when the second function of the image display apparatus is being executed;
storing in the second memory image data relating to the first function when the second function is not being executed;
displaying on a first portion of a display a non-composite image based on contents of one or the other of the first and second memories; and
displaying on a second portion of the display a composite image based on a composite of contents of both the first and second memories.

30. A atorage device storing instructions executable by a processing system to perform the method according to claim 29.

31. An image display apparatus comprising a storage device according to claim 30.

* * * * *